(12) United States Patent
Sibert

(10) Patent No.: US 7,689,827 B2
(45) Date of Patent: *Mar. 30, 2010

(54) SYSTEMS AND METHODS FOR USING CRYPTOGRAPHY TO PROTECT SECURE AND INSECURE COMPUTING ENVIRONMENTS

(75) Inventor: W. Olin Sibert, Lexington, MA (US)

(73) Assignee: Intertrust Technologies Corp., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/805,463

(22) Filed: May 22, 2007

(65) Prior Publication Data

US 2007/0226798 A1  Sep. 27, 2007

Related U.S. Application Data

(63) Continuation of application No. 09/628,692, filed on Jul. 28, 2000, now Pat. No. 7,243,236.

(60) Provisional application No. 60/146,426, filed on Jul. 29, 1999.

(51) Int. Cl.
G06F 21/00  (2006.01)
(52) U.S. Cl. .................. 713/176; 713/168; 713/179; 713/186; 713/187; 726/2; 726/26
(58) Field of Classification Search ................ 713/168, 713/176, 179, 186, 187; 726/26, 2
See application file for complete search history.

(56) References Cited

U.S. PATENT DOCUMENTS 4,672,572 A  6/1987  Alsberg (Continued)

FOREIGN PATENT DOCUMENTS

AU  A-36815/97  2/1998

(Continued)

OTHER PUBLICATIONS

Advisory Action dated Dec. 4, 2006, issued in related U.S. Appl. No. 09/628,692, filed Jul. 28, 2000, W. Olin Sibert.

(Continued)

*Primary Examiner*—Carl Colin
(74) *Attorney, Agent, or Firm*—Finnegan, Henderson, Farabow, Garrett & Dunner, LLP

(57) ABSTRACT

Computation environments are protected from bogus or rogue load modules, executables, and other data elements through use of digital signatures, seals, and certificates issued by a verifying authority. A verifying authority—which may be a trusted independent third party—tests the load modules and/or other items to verify that their corresponding specifications are accurate and complete, and then digitally signs them based on a tamper resistance work factor classification. Secure computation environments with different tamper resistance work factors use different digital signature authentication techniques (e.g., different signature algorithms and/or signature verification keys), allowing one tamper resistance work factor environment to protect itself against load modules from another tamper resistance work factor environment. The verifying authority can provide an application intended for insecure environments with a credential having multiple elements covering different parts of the application. To verify the application, a trusted element can issue challenges based on different parts of the authenticated credential that the trusted element selects in an unpredictable (e.g., random) way, and deny service (or take other appropriate action) if the responses do not match the authenticated credential.

21 Claims, 28 Drawing Sheets

EXAMPLE CREDENTIAL VALIDATION

U.S. PATENT DOCUMENTS

| | | | |
|---|---|---|---|
| 4,799,156 A | 1/1989 | Shavit et al. | |
| 4,823,264 A | 4/1989 | Deming | |
| 4,827,508 A | 5/1989 | Shear | |
| 4,930,073 A | 5/1990 | Cina, Jr. | |
| 5,103,476 A | 4/1992 | Waite et al. | |
| 5,111,390 A | 5/1992 | Ketcham | |
| 5,224,163 A | 6/1993 | Gasser et al. | |
| 5,319,705 A | 6/1994 | Halter et al. | |
| 5,343,527 A | 8/1994 | Moore | |
| 5,390,330 A | 2/1995 | Talati | |
| 5,491,800 A | 2/1996 | Goldsmith et al. | |
| 5,640,546 A | 6/1997 | Gopinath et al. | |
| 5,692,047 A | 11/1997 | McManis | |
| 5,745,678 A | 4/1998 | Herzberg et al. | |
| 5,748,960 A | 5/1998 | Fischer | |
| 5,757,914 A | 5/1998 | McManis | |
| 5,892,900 A | 4/1999 | Ginter et al. | |
| 5,910,987 A | 6/1999 | Ginter et al. | |
| 5,915,019 A | 6/1999 | Ginter et al. | |
| 5,919,257 A * | 7/1999 | Trostle | 726/22 |
| 5,920,861 A | 7/1999 | Hall et al. | |
| 5,940,504 A | 8/1999 | Griswold | |
| 5,943,422 A | 8/1999 | Van Wie et al. | |
| 5,970,145 A | 10/1999 | McManis | |
| 5,991,399 A | 11/1999 | Graunke et al. | |
| 6,009,543 A * | 12/1999 | Shavit | 712/200 |
| 6,047,242 A | 4/2000 | Benson | |
| 6,112,181 A | 8/2000 | Shear et al. | |
| 6,138,236 A * | 10/2000 | Mirov et al. | 726/26 |
| 6,148,083 A | 11/2000 | Fieres et al. | |
| 6,148,292 A * | 11/2000 | Reisinger et al. | 705/30 |
| 6,157,721 A | 12/2000 | Shear et al. | |
| 6,185,683 B1 | 2/2001 | Ginter et al. | |
| 6,330,549 B1 * | 12/2001 | Merkle | 705/51 |
| 6,389,537 B1 * | 5/2002 | Davis et al. | 713/187 |
| 6,415,385 B1 * | 7/2002 | Cotugno et al. | 713/176 |
| 6,735,696 B1 * | 5/2004 | Hannah | 713/189 |
| 6,802,006 B1 * | 10/2004 | Bodrov | 713/187 |
| 6,820,200 B2 | 11/2004 | Takeuchi et al. | |
| 6,880,149 B2 * | 4/2005 | Cronce | 717/126 |
| 7,131,144 B2 * | 10/2006 | Rabin et al. | 726/30 |

FOREIGN PATENT DOCUMENTS

| | | |
|---|---|---|
| AU | A-36816/97 | 2/1998 |
| AU | A-36840/97 | 2/1998 |
| EP | 0 128 672 A1 | 12/1984 |
| EP | 0 399 822 A2 | 11/1990 |
| EP | 0 421 409 A2 | 4/1991 |
| EP | 0 565 314 A2 | 10/1993 |
| EP | 0 913 757 A2 | 5/1999 |
| GB | 22264796 A | 9/1993 |
| WO | WO 90/02382 | 3/1990 |
| WO | WO 92/22870 | 12/1992 |
| WO | WO 94/03859 | 2/1994 |
| WO | WO 94/06103 | 3/1994 |
| WO | WO 96/27155 | 9/1996 |
| WO | WO 97/43761 | 11/1997 |
| WO | WO 98/09209 | 3/1998 |
| WO | WO 98/10381 | 3/1998 |
| WO | WO 98/37481 | 8/1998 |
| WO | WO 98/45768 | 10/1998 |
| WO | WO 99/01815 | 1/1999 |
| WO | WO 99/24928 | 5/1999 |
| WO | WO 00/48296 | 9/1999 |

OTHER PUBLICATIONS

Berkovitz, S. et al., "Authentication of Mobile Agents," Mobile Agents and Security, Springer-Verlag, Giovanni Vigna, Ed., 1998, pp. 114-136.

Blaze, M. et al., "Decentralized Trust Management," Proc. IEEE Conference on Security and Privacy, 1996, pp. 164-173.

Chess, D., "Security Issues in Mobile Code Systems," Mobile Agents and Security, Springer-Verlag, Giovanni Vigna, Ed., 1998, 14 pages.

Ellison, C. et al., "SPKI Certificate Theory," Internet Engineering Task Force (IETF) RFC 2693, Sep. 1999, 38 pages, available at http://wvw.ietf.org/rfc/rfc26939.txt?number=2693.

Final Office Action dated Aug. 9, 2006, issued in related U.S. Appl. No. 09/628,692, filed Jul. 28, 2000, Sibert.

Final Office Action dated Dec. 16, 2004, issued in related U.S. Appl. No. 09/628,692, filed Jul. 28, 2000, Sibert.

Gong, Li, et al., "Signing, Sealing and Guarding Java Objects," Mobile Agents and Security, G. Vigna, editor, Springer-Verlag, 1998, vol. 1419 of LNCS, pp. 206-216.

Hohl, F., "Time Limited Blackbox Security: Protecting Mobile Agents from Malicious Hosts," Lecture Notes in Computer Science, vol. 1419: Mobile Agents and Security, Springer-Verlag, 1998, G. Vigna Ed., pp. 90-111.

Microsoft Authenticode Technology, Microsoft Corporation, Oct. 1996.

Notice of Allowance dated Mar. 9, 2007, issued in related U.S. Appl. No. 09/628,692 filed Jul. 28, 2000, Sibert.

Office Action dated Jan. 14, 2004, issued in related U.S. Appl. 09/628,692, filed Jul. 28, 2000, Sibert.

Office Action dated Nov. 28, 2005, issued in related U.S. Appl. No. 09/628,692, filed Jul. 8, 2000, Sibert.

Sander, T. et al., "Protecting Mobile Agents Against Malicious Hosts," Mobile Agents and Security: Lecture Notes in Computer Science, Springer-Verlag, G. Vigna, Ed., vol. 1419, Nov. 11, 1997, 16 pages.

Sander, T. et al., "Towards Mobile Crytography,"IEEE Proceedings of Security and Privacy, May 1998, 10 pages.

White S.R., et al., "ABYSS: A Trusted Architecture for Softrware Protection," (IBM Thomas J. Watson Research Center, Yorktown Heights, NY), 1987, pp. 38-50.

* cited by examiner

FIG. 1 Defective or "Bogus" Load Modules Can Cause Problems

FIG. 2 Verifying Load Modules

FIG. 3 Before Protected Processing Environment Uses A Load Module, It Checks To See If Load Module Has Been Verified Certifying Load Module by
Checking it Against its Documentation Creating a Certifying
Digital Signature

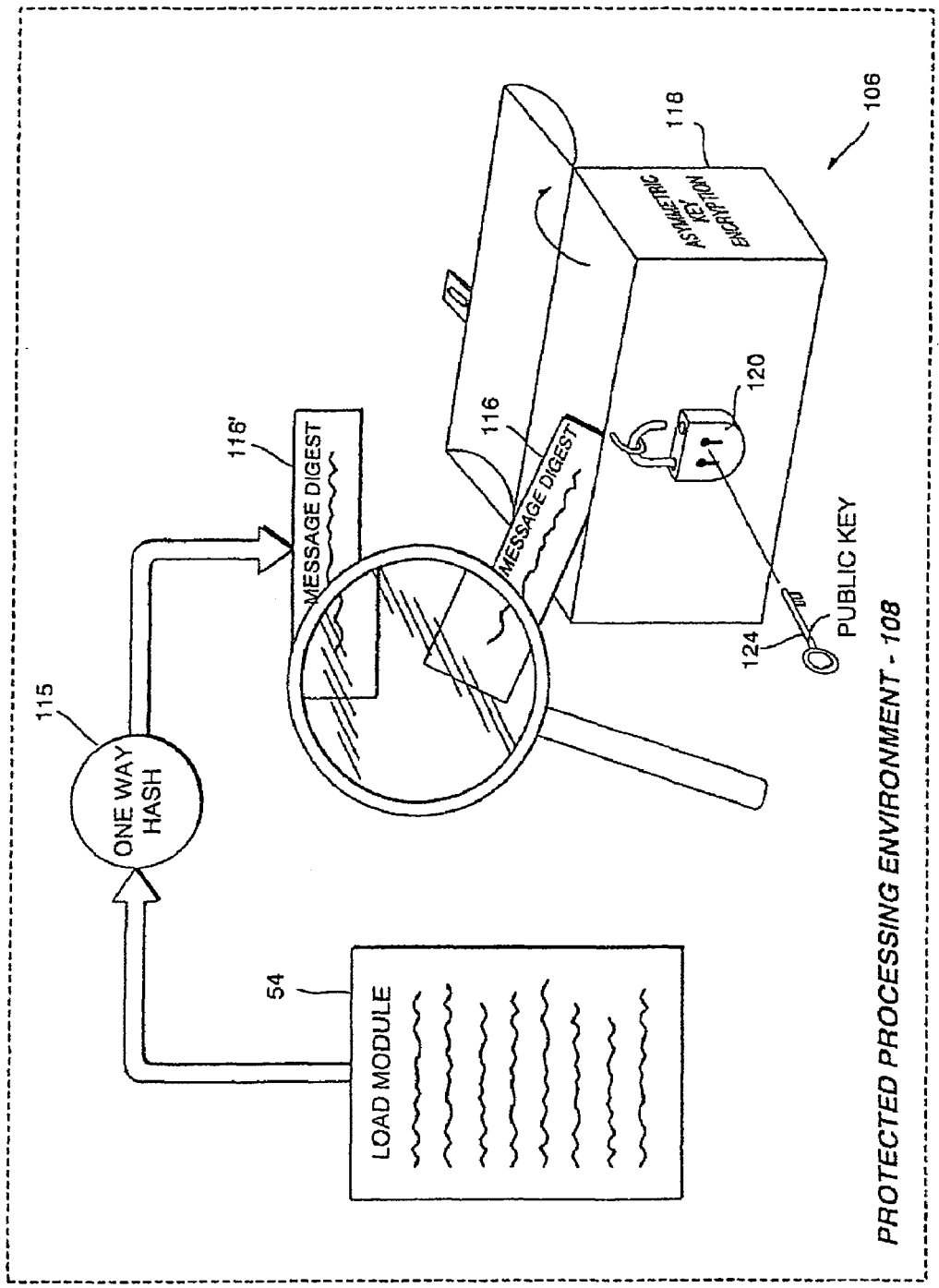
FIG. 6 Authenticating a Digital Signature

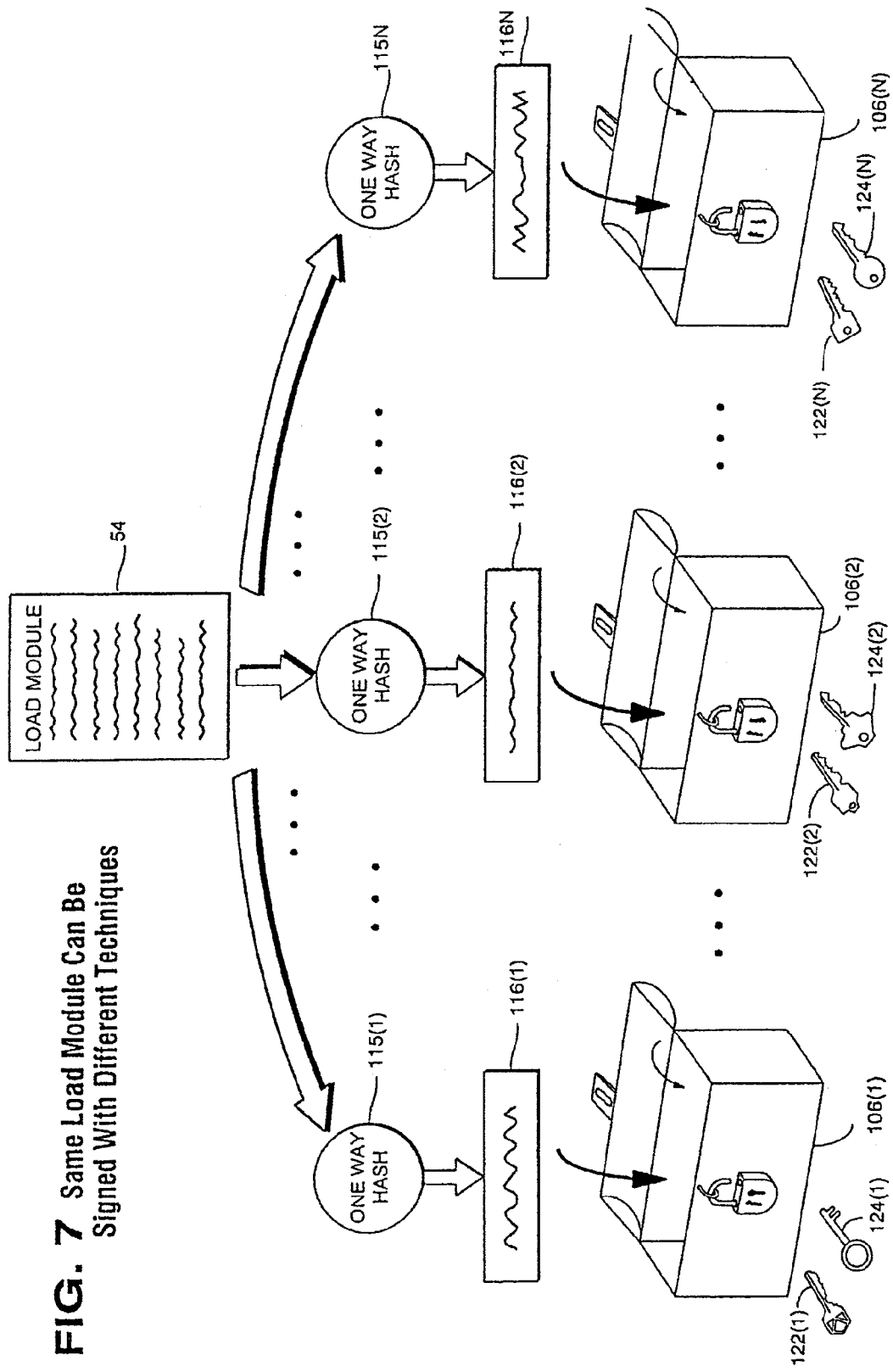
FIG. 7 Same Load Module Can Be Signed With Different Techniques

FIG. 8 Same Load Module Can Be Distributed with Multiple Signatures
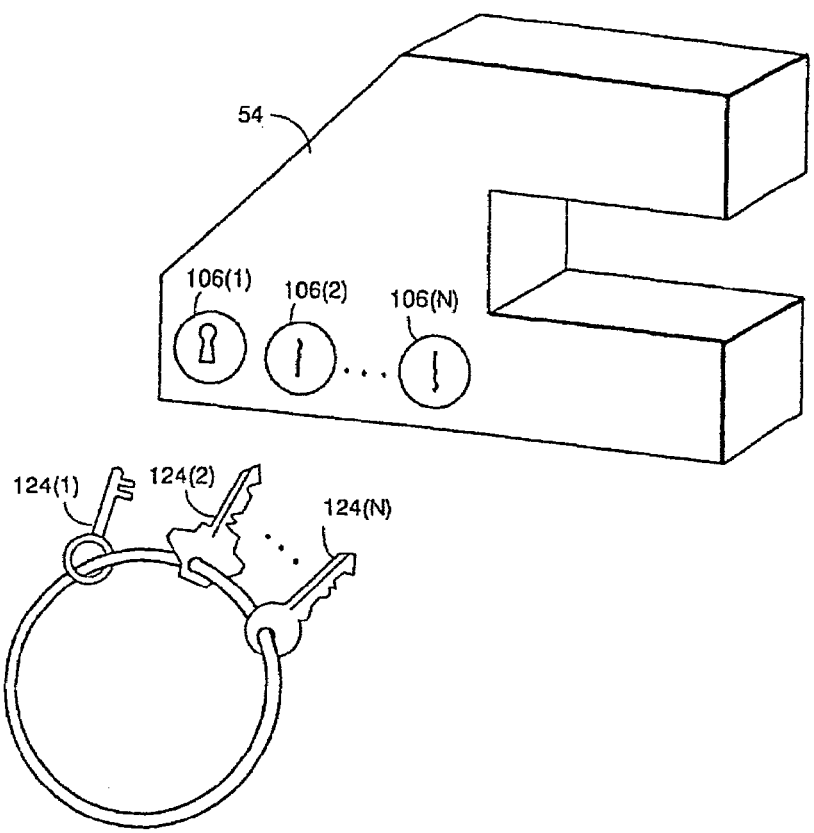
FIG. 8A Different Processing Environments Can Have Different Subsets of Keys
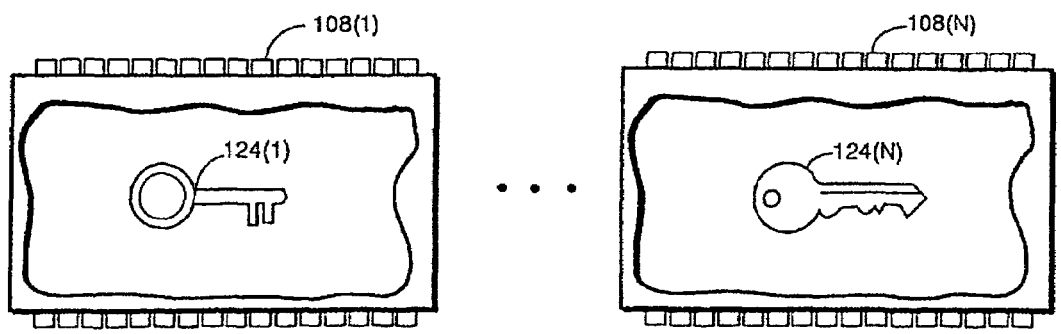

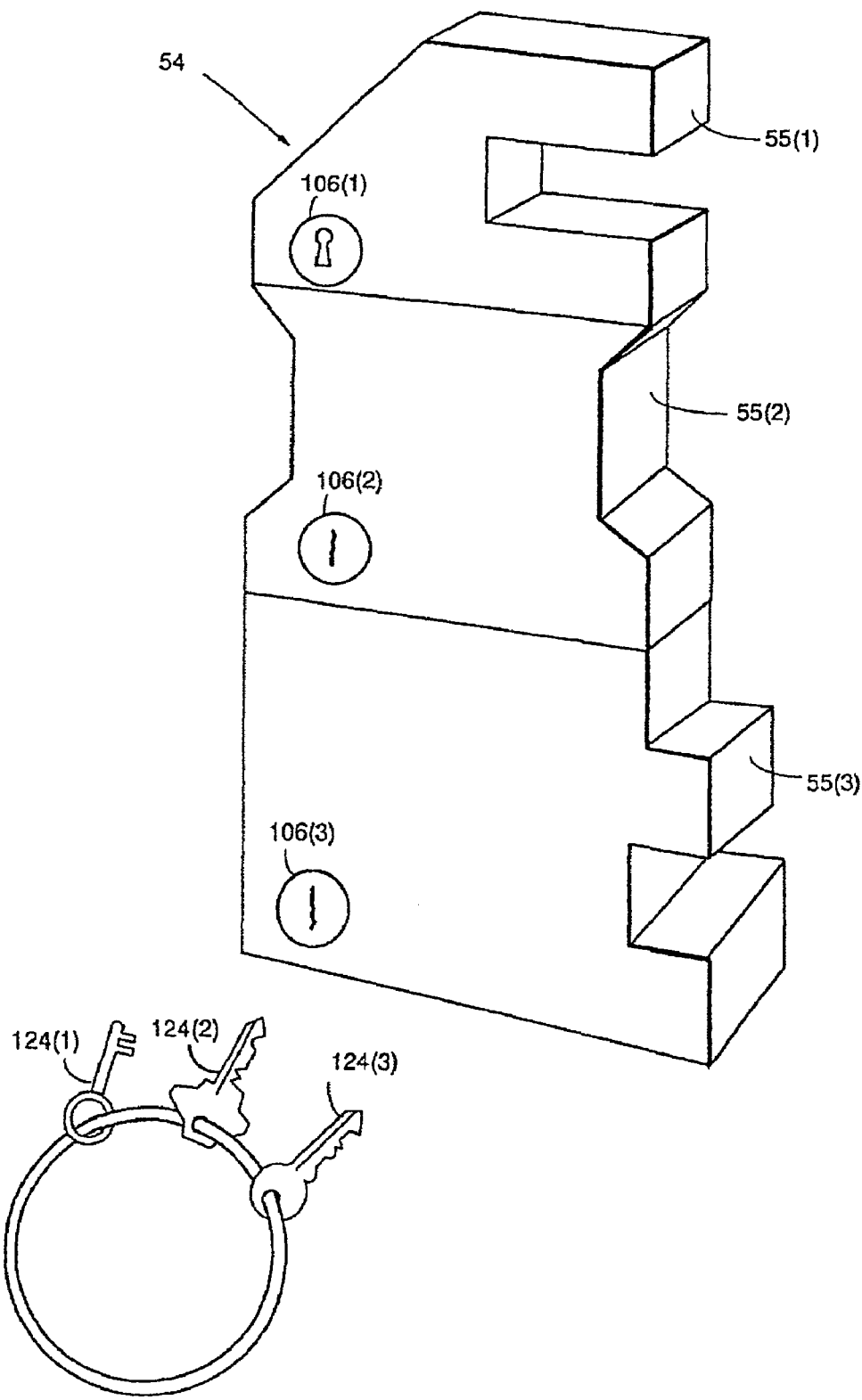
FIG. 9 Load Module Can Have Several Independently Signed Portions

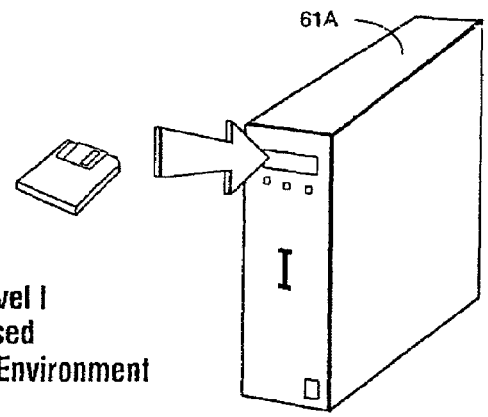
FIG. 10A Assurance Level I
Software-Based
Protected Processing Environment
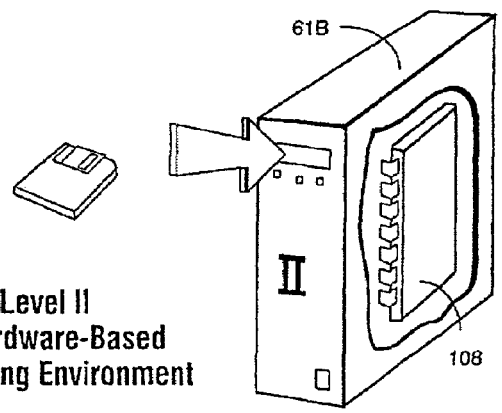
FIG. 10B Assurance Level II
Software and Hardware-Based
Protected Processing Environment
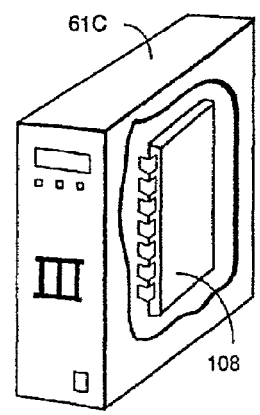
FIG. 10C Assurance Level III
Hardware-Based
Protected Processing Environment

FIG. 11A Level I
Digital Signature
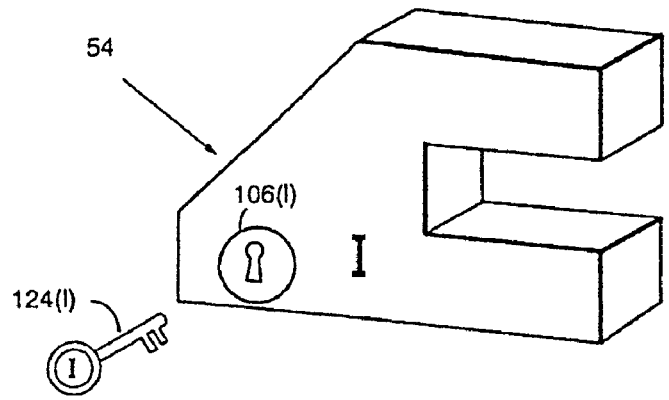
FIG. 11B Level II
Digital Signature
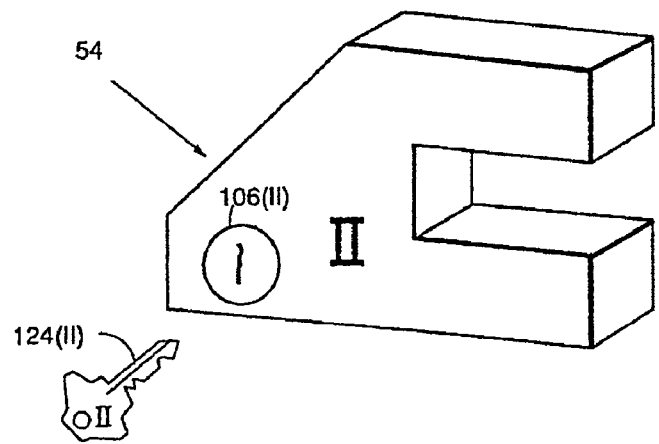
FIG. 11C Level III
Digital Signature
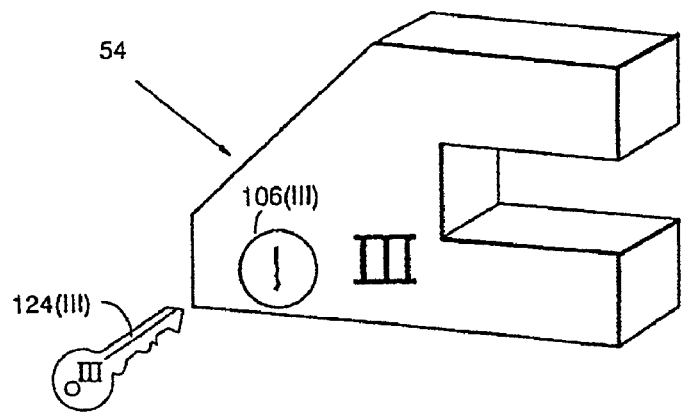

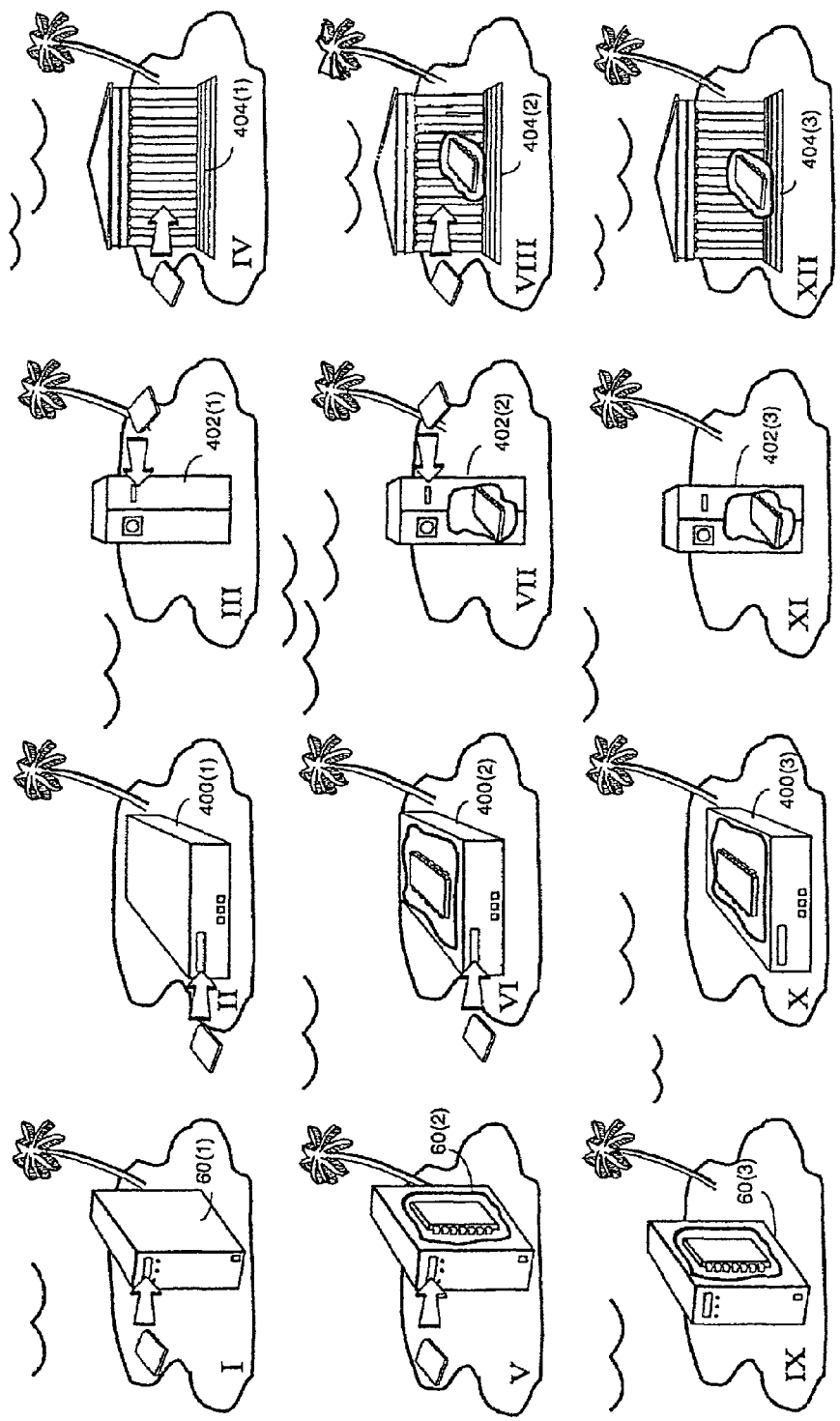
FIG. 12  Using Digital Signatures For Compartmentalizing Different Assurance Levels

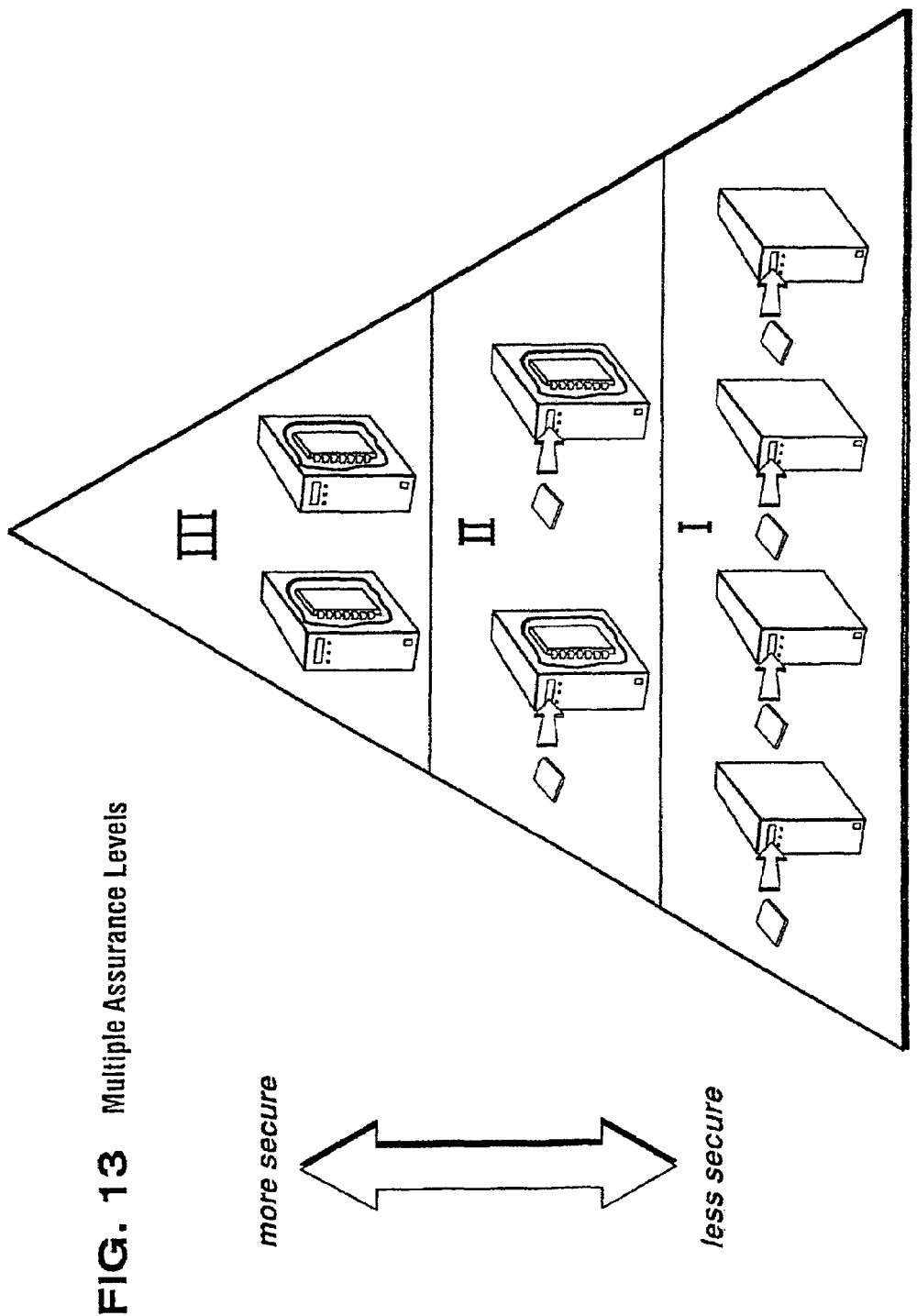
FIG. 13  Multiple Assurance Levels

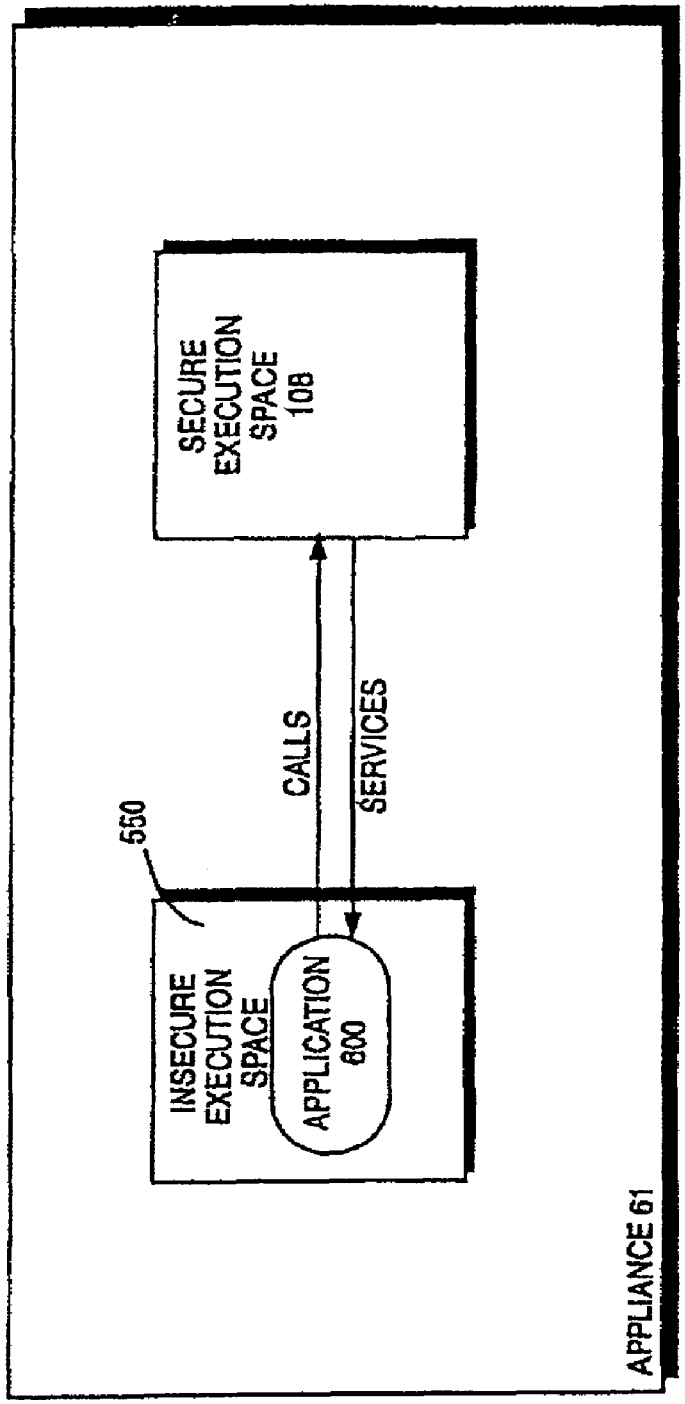
FIG. 15  EXAMPLE APPLIANCE EXECUTING APPLICATION PROGRAM IN INSECURE EXECUTION SPACE

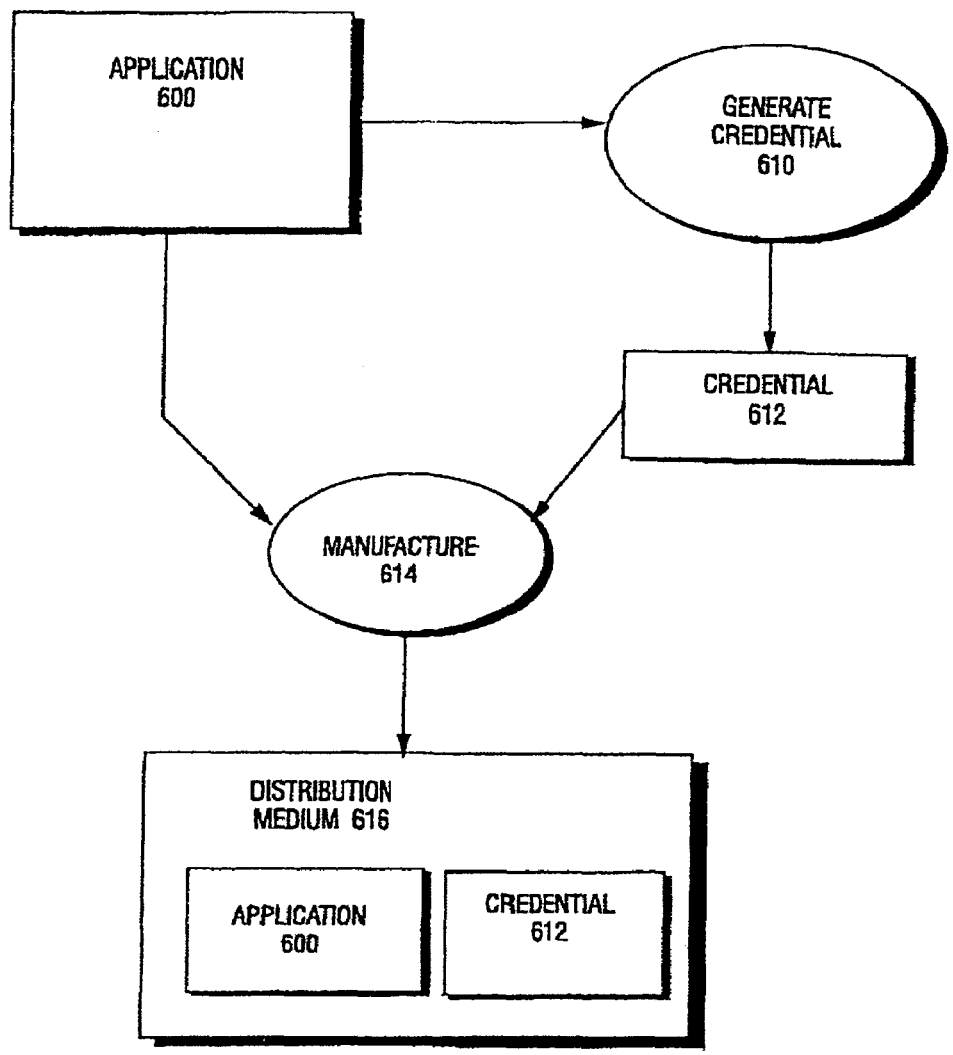
FIG. 16 EXAMPLE APPLICATION CERTIFICATION PROCESS

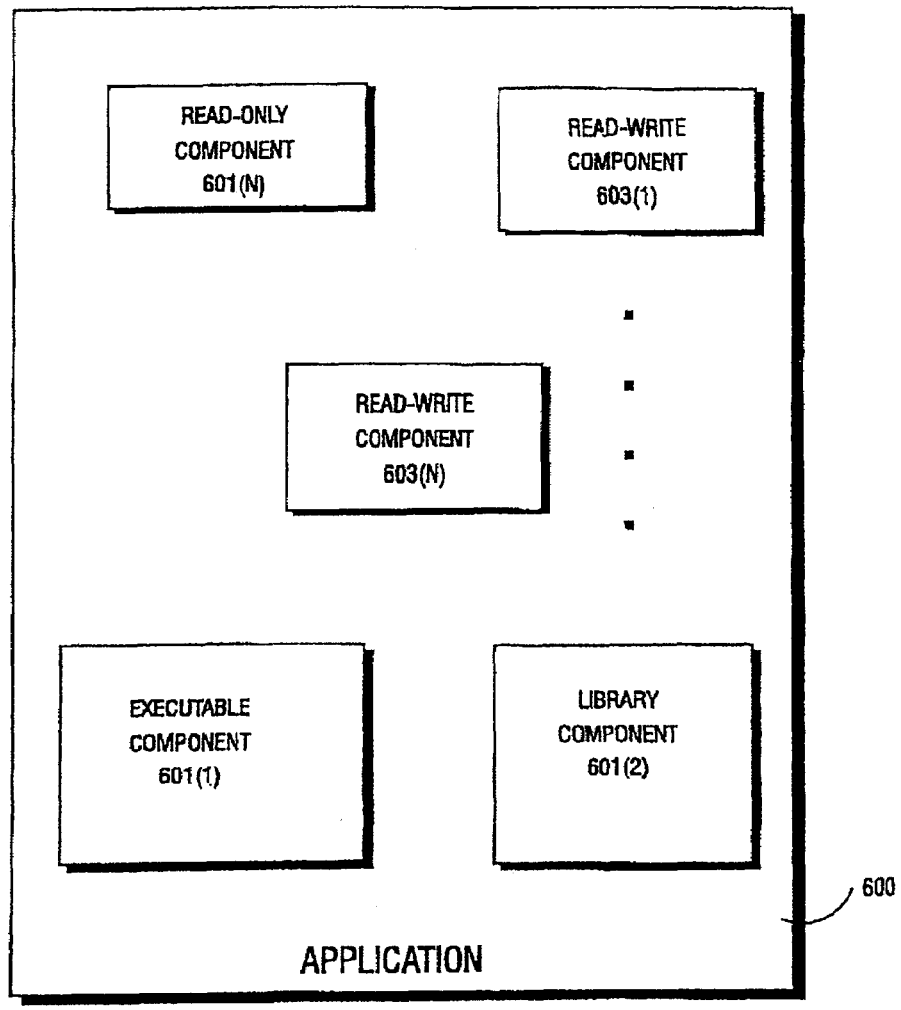
FIG. 16A EXAMPLE APPLICATION PROGRAM AND COMPONENTS

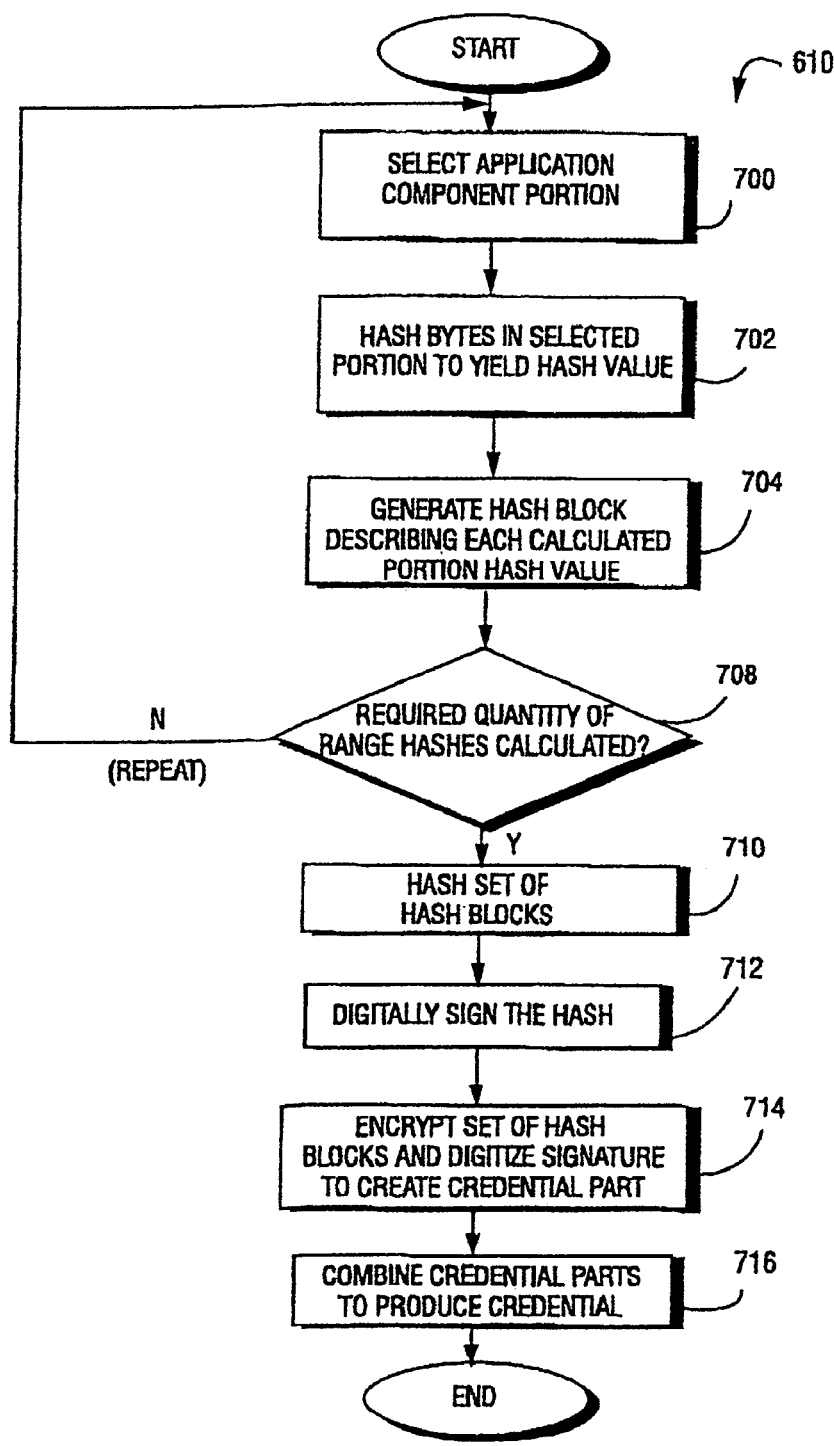
FIG. 17 EXAMPLE CREDENTIAL CREATION PROCESS

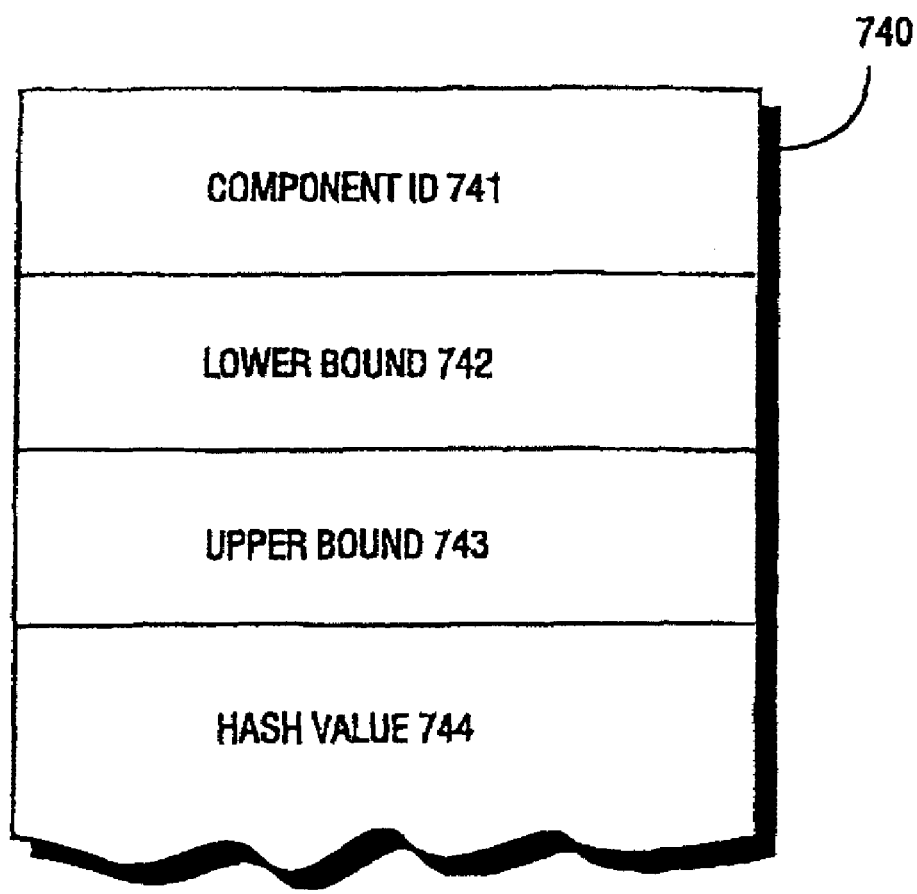
FIG. 18 EXAMPLE HASH BLOCK

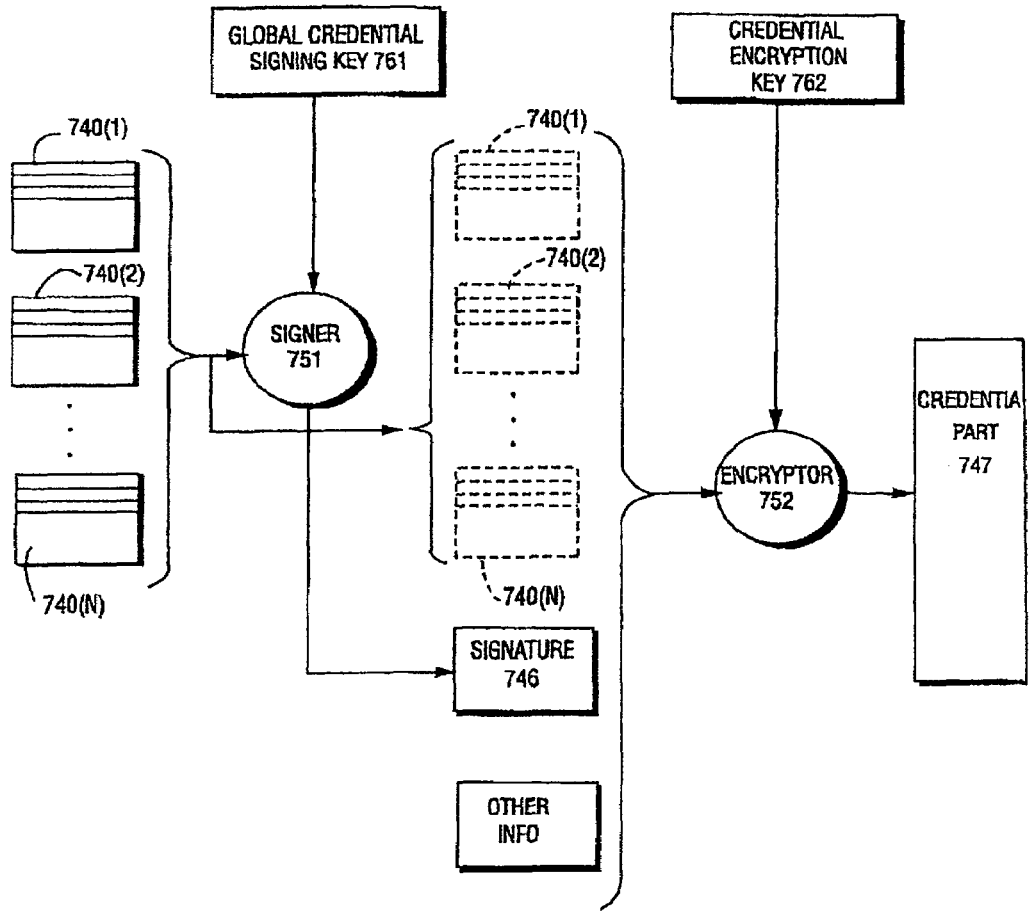
FIG. 19 EXAMPLE CREDENTIAL CREATION

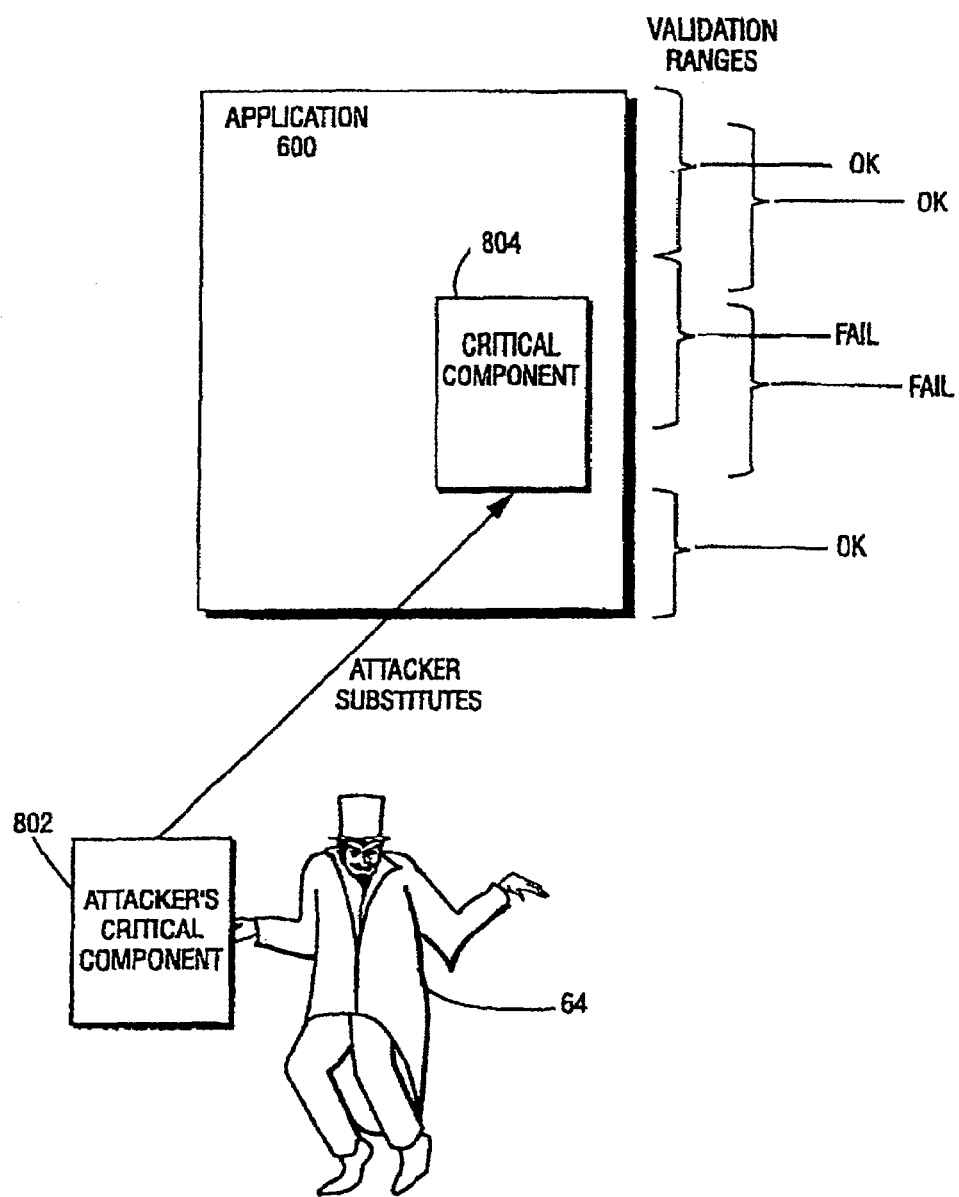
FIG. 20  EXAMPLE ATTACK ON APPLICATION

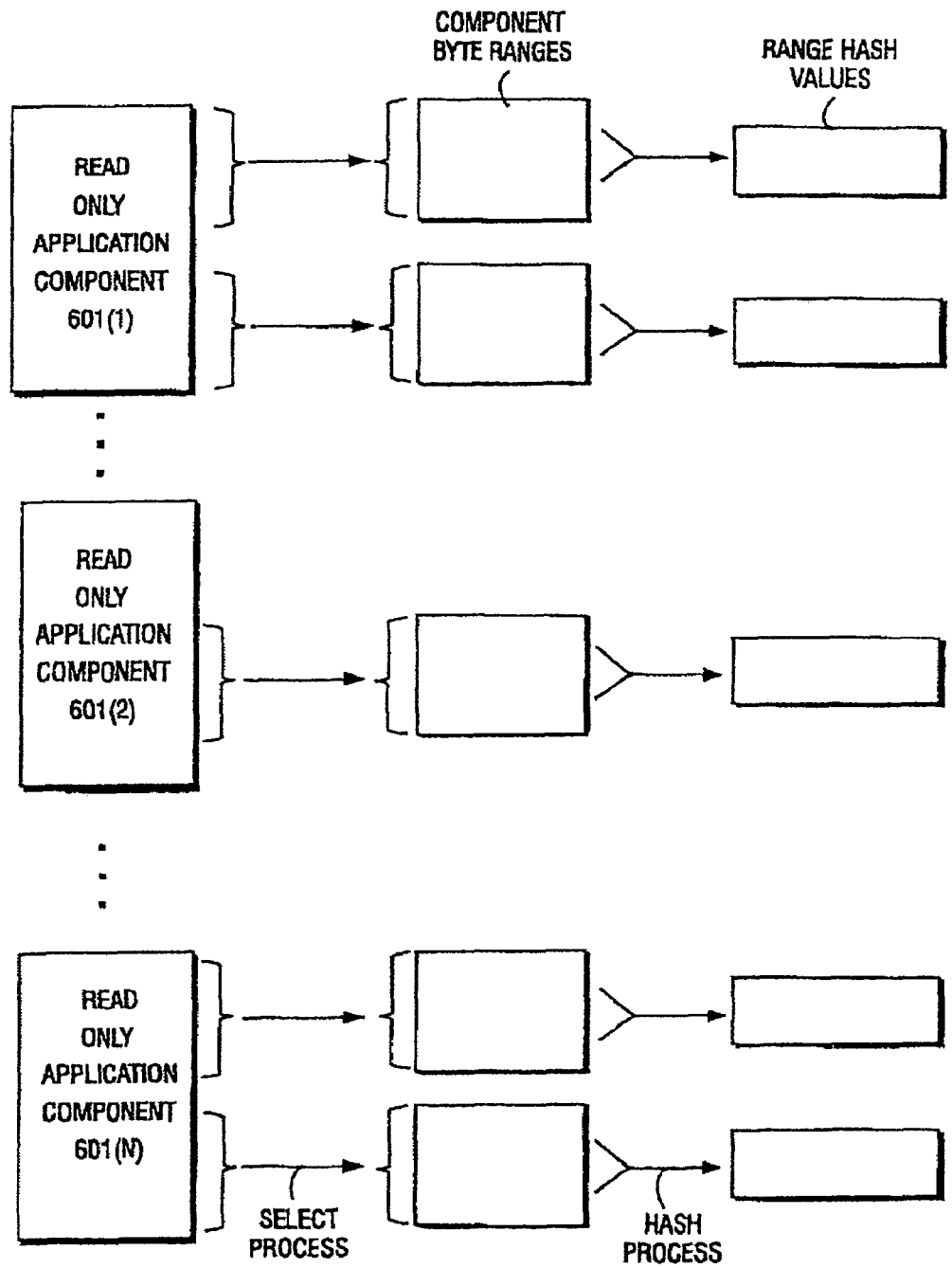
FIG. 20A  EXAMPLE NON-OVERLAPPING HASH RANGES

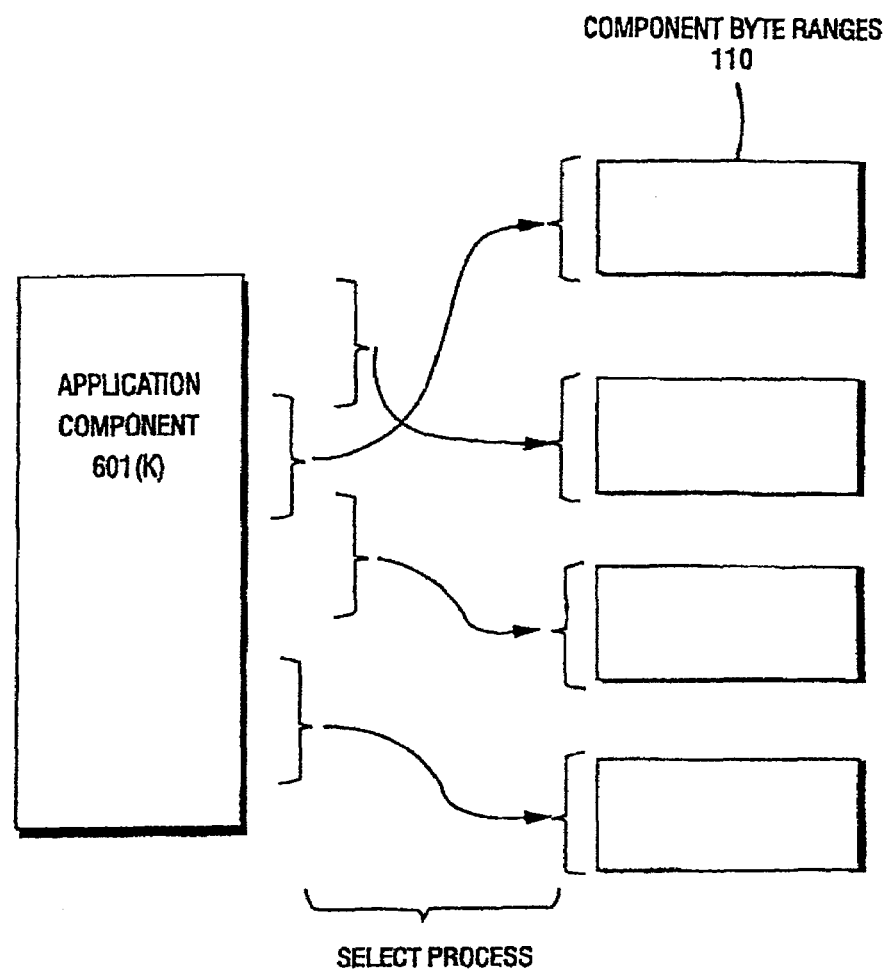
FIG. 20B EXAMPLE OF OVERLAPPING HASH RANGES

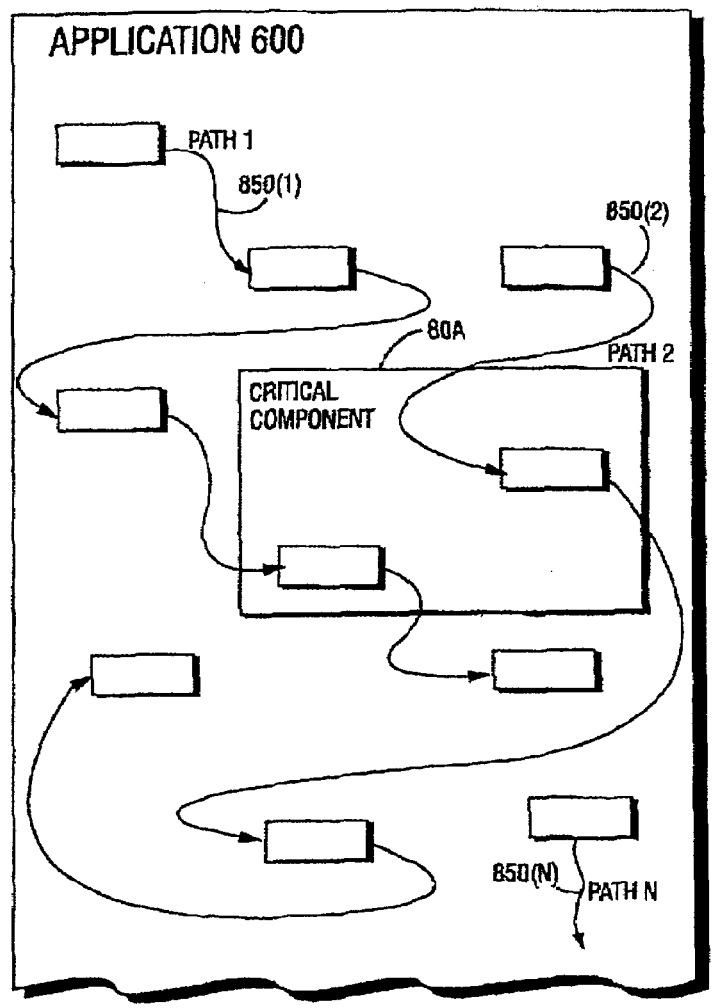
FIG. 20C PSEUDO-RANDOM VALIDATION PATHS IN APPLICATION

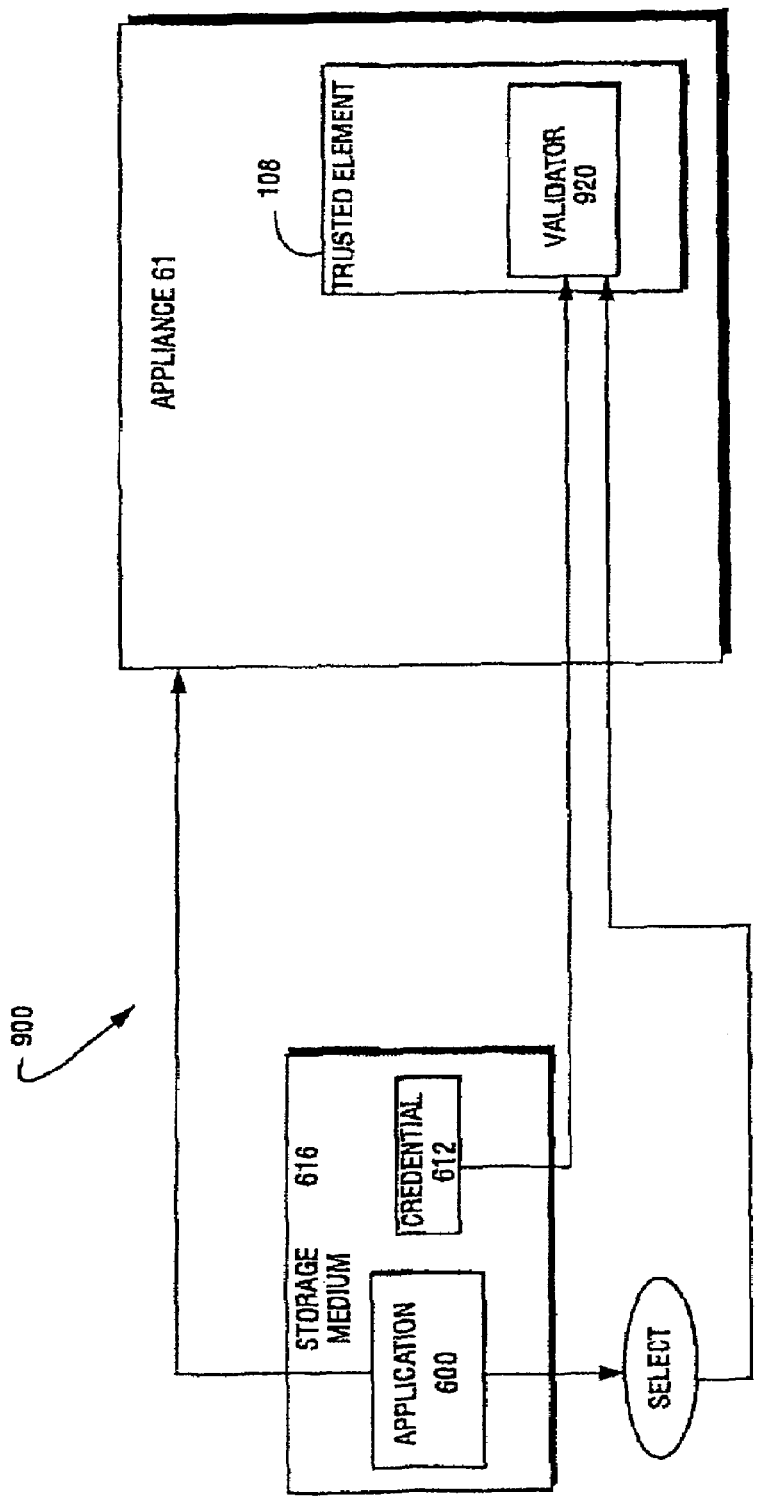
FIG. 21  EXAMPLE CREDENTIAL VALIDATION PROCESS

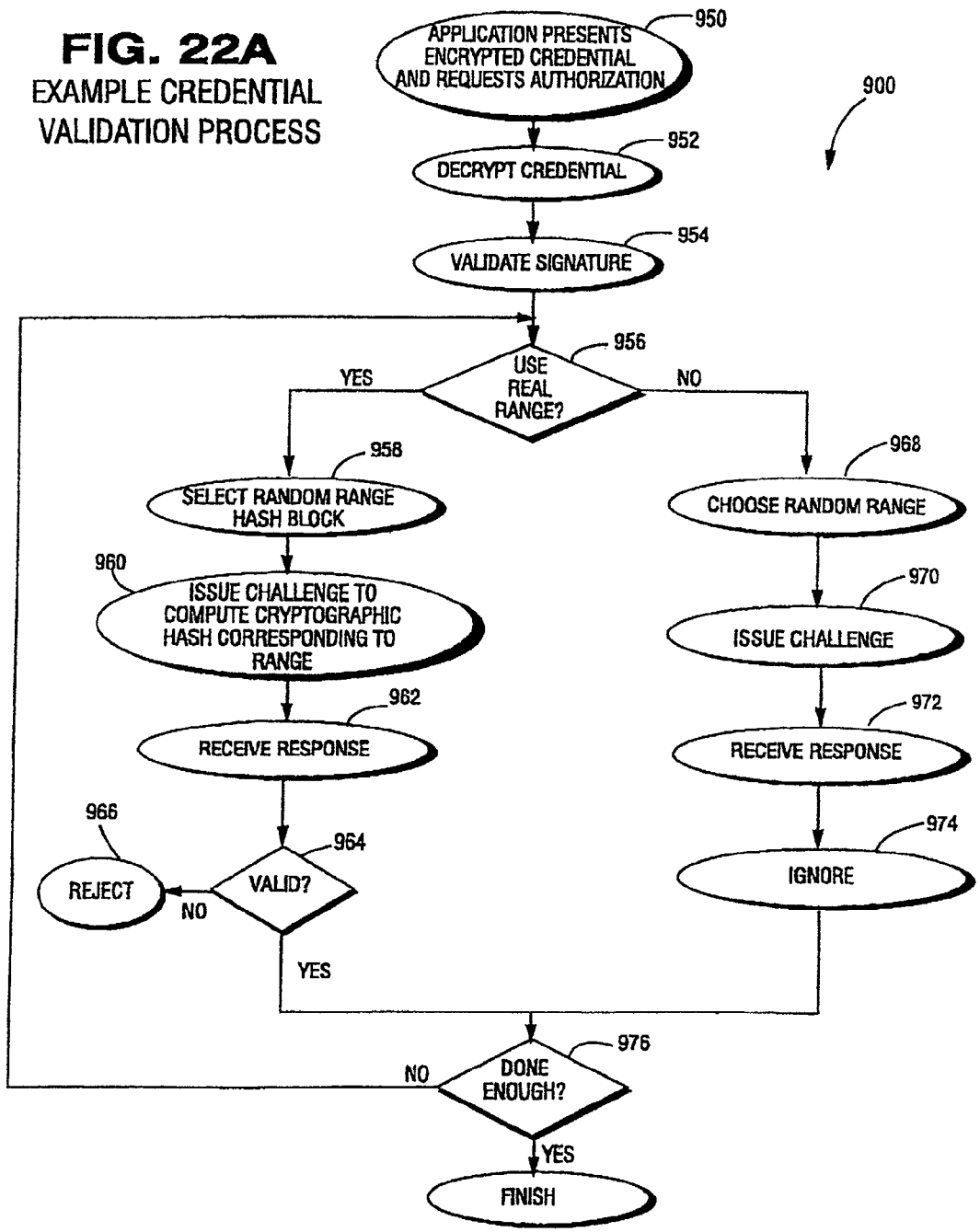

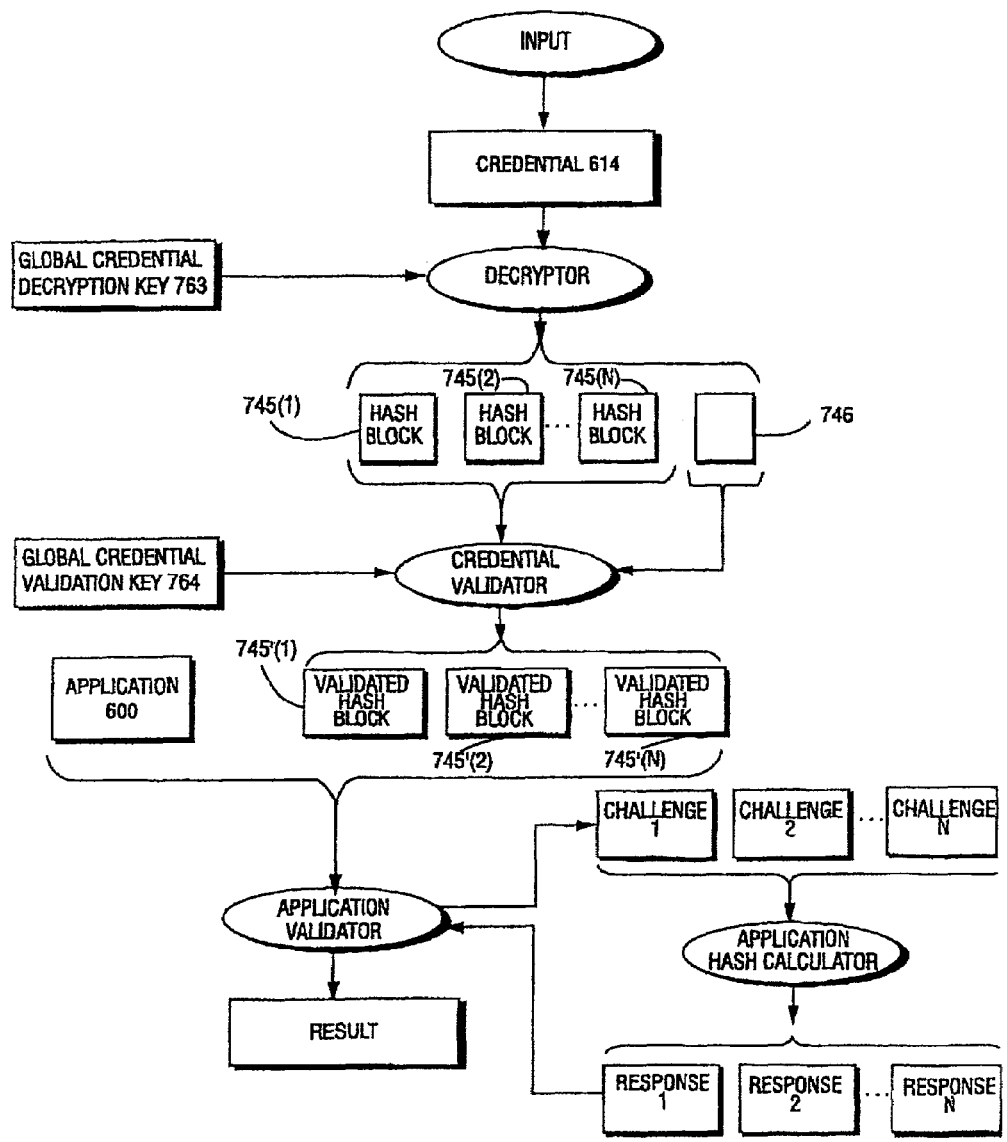
FIG. 22B EXAMPLE CREDENTIAL VALIDATION

SYSTEMS AND METHODS FOR USING CRYPTOGRAPHY TO PROTECT SECURE AND INSECURE COMPUTING ENVIRONMENTS

RELATED APPLICATIONS

This application is a continuation of application Ser. No. 09/628,692, filed Jul. 28, 2000, now U.S. Pat. No. 7,243,236 which claims the benefit of U.S. Provisional Application No. 60/146,426, entitled " Systems and Methods for Using Cryptography to Protect Secure and Insecure Computing Environments," filed Jul. 29, 1999, and is related to commonly-assigned U.S. patent application Ser. No. 08/689,754, entitled "Systems and Methods Using Cryptography to Protect Secure Computing Environments," filed Aug. 12, 1996, now U.S. Pat. No. 6,157,721, issued Dec. 5, 2000, each of which are hereby incorporated by reference in their entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to computer security. More specifically, the present invention relates to computer security techniques based at least in part on cryptography, that protect a computer processing environment against potentially harmful computer executables, programs, and/or data; and to techniques for certifying load modules such as executable computer programs or fragments thereof as being authorized for use by secure and/or insecure processing environments.

BACKGROUND OF THE INVENTION

Computers have become increasingly central to business, finance and other important aspects of our lives. It is now more important than ever to protect computers from "bad" or harmful computer programs. Unfortunately, since many of our most critical business, financial, and governmental tasks now rely heavily on computers, dishonest people have a great incentive to use increasingly sophisticated and ingenious computer attacks.

Imagine, for example, if a dishonest customer of a major bank could reprogram the bank's computer so it adds to, instead of subtracts from, the customer's account—or diverts a penny to the customer's account from anyone else's bank deposit in excess of $10,000. If successful, such attacks would not only allow dishonest people to steal, but could also undermine society's confidence in the integrity and reliability of the banking system.

Terrorists can also try to attack us through our computers. We cannot afford to have harmful computer programs destroy the computers driving the greater San Francisco metropolitan air traffic controller network, the New York Stock Exchange, the life support systems of a major hospital, or the Northern Virginia metropolitan area fire and paramedic emergency dispatch service.

There are many different kinds of "bad" computer programs, including "Trojan horses"—programs that cause a computer to act in a manner not intended by its operator, named after the famous wooden horse of Troy that delivered an attacking army disguised as an attractive gift. Some of the most notorious "bad" computer programs are so-called "computer viruses"—"diseases" that a computer can "catch" from another computer. A computer virus can be a computer program that instructs the computer to do harmful or spurious things instead of useful things—and can replicate itself to spread from one computer to another. Since the computer does whatever its instructions tell it to do, it will carry out the bad intent of a malicious human programmer who wrote the computer virus program, unless the computer is protected from the computer virus program. Special anti-virus protection software exists, but it unfortunately is only partially effective—for example, because new viruses can escape detection until they become widely known and recognized, and because sophisticated viruses can escape detection by masquerading as tasks the computer is supposed to be performing.

Computer security risks of all sorts—including the risks from computer viruses—have increased dramatically as computers have become increasingly connected to one another over the Internet and by other means. Increased computer connectivity provides increased capabilities, but also creates a host of computer security problems that have not been fully solved. For example, electronic networks are an obvious path for spreading computer viruses. In October 1988, a university student used the Internet (a network of computer networks connected to millions of computers worldwide) to infect thousands of university and business computers with a self-replicating "worm" virus that took over the infected computers and caused them to execute the computer virus instead of performing the tasks they were supposed to perform. This computer virus outbreak (which resulted in a criminal prosecution) caused widespread panic throughout the electronic community.

Computer viruses are by no means the only computer security risk made even more significant by increased computer connectivity. For example, a significant percentage of the online electronic community has recently become committed to a new "portable" computer language called Java™, developed by Sun Microsystems of Mountain View, Calif. Java was designed to allow computers to interactively and dynamically download computer program code fragments (called "applets") over an electronic network such as the Internet, and to execute the downloaded code fragments locally. The Java programming language's "download and execute" capability is valuable because it allows certain tasks to be performed on local equipment using local resources. For example, a user's computer could run a particularly computationally or data-intensive routine—thus relieving the provider's computer from having to run the task and/or eliminating the need to transmit large amounts of data over the communications path.

While Java's "download and execute" capability has great potential, it raises significant computer security concerns. For example, Java applets could be written to damage hardware, software, or information on the recipient's computer; to make the computer unstable by depleting its resources; and/or to access confidential information on the computer and send it to someone else without first getting the computer owner's permission. People have expended large amounts of time and effort trying to solve Java's security problems. To alleviate some of these concerns, Sun Microsystems has developed a Java interpreter providing certain built-in security features such as:

a Java verifier that will not let an applet execute until the verifier verifies that the applet does not violate certain rules;

a Java class loader that treats applets originating remotely differently from those originating locally; and a Java security manager that controls access to resources such as files and network access.

In addition, Sun has indicated that future Java interpreters may use digital signatures to authenticate applets.

Numerous security flaws have been found despite the use of these techniques. Moreover, a philosophy underlying this overall security design is that a user will have no incentive to compromise the security of her own locally installed Java interpreter—and that any such compromise is inconsequential from a system security standpoint because only the user's own computer (and its contents) are at risk. This philosophy—which is typical of many security system designs—is seriously flawed in many useful electronic commerce contexts for reasons described below with reference to commonly—assigned U.S. Pat. No. 5,892,900, entitled "Systems and Methods for Secure Transaction Management and Electronic Rights Protection," issued Apr. 6, 1999 ("the '900 patent"), which is hereby incorporated by reference in its entirety.

The '900 patent describes a "virtual distribution environment" comprehensively providing overall systems and wide arrays of methods, techniques, structures and arrangements that enable secure, efficient electronic commerce and rights management, including on the Internet or other "Information Super Highway."

The '900 patent describes, among other things, techniques for providing secure, tamper-resistant execution spaces within a "protected processing environment" for computer programs and data. The projected processing environment described in the '900 patent may be hardware-based, software-based, or a hybrid. It can execute computer code that the '900 patent refers to as "load modules." (See, for example, FIG. 23 of the '900 patent and corresponding text). These load modules—which can be transmitted from remote locations within secure cryptographic wrappers or "containers"—are used to perform the basic operations of the virtual distribution environment. Load modules may contain algorithms, data, cryptographic keys, shared secrets, and/or other information that permits a load module to interact with other system components (e.g., other load modules and/or computer programs operating in the same or different protected processing environment). For a load module to operate and interact as intended, it should execute without unauthorized modification and its contents may need to be protected from disclosure.

Unlike many other computer security scenarios, there may be a significant incentive for an owner of a protected processing environment to attack his or her own protected processing environment. For example:

the owner may wish to "turn off" payment mechanisms necessary to ensure that people delivering content and other value receive adequate compensation; or the owner may wish to defeat other electronic controls preventing him or her from performing certain tasks (for example, copying content without authorization); or the owner may wish to access someone else's confidential information embodied within electronic controls present in the owner's protected processing environment; or the owner may wish to change the identity of a payment recipient indicated within controls such that they receive payments themselves, or to interfere with commerce; or the owner may wish to defeat the mechanism(s) that disable some or all functions when a budget has been exhausted, or audit trails have not been delivered.

Security experts can often be heard to say that to competently do their job, they must "think like an attacker." For example, a successful home security system installer must try to put herself in the place of a burglar trying to break in. Only by anticipating how a burglar might try to break into a house can the installer successfully defend the house against burglary. Similarly, computer security experts must try to anticipate the sorts of attacks that might be brought against a presumably secure computer system.

From this "think like an attacker" viewpoint, introducing a bogus load module is one of the strongest forms of attack (by a protected processing environment user or anyone else) on the virtual distribution environment disclosed in the '900 patent. Because load modules have access to internal protected data structures within protected processing environments and also (at least to an extent) control the results brought about by those protected processing environments, bogus load modules can perform almost any action possible in the virtual distribution environment without being subject to intended electronic controls (putting aside for the moment additional possible local protections such as addressing and/or ring protection, and also putting aside system level fraud and other security related checks). Especially likely attacks may range from straightforward changes to protected data (for example, adding to a budget, billing for nothing instead of the desired amount, etc.) to wholesale compromise (for example, using a load module to expose a protected processing environment's cryptographic keys). For at least these reasons, the methods for validating the origin and soundness of a load module are critically important.

A variety of techniques can be used to secure protected processing environments against in authentic load modules introduced by the computer owner, user, or any other party, including for example:

Encrypting and authenticating load modules whenever they are shared between protected processing environments via a communications path outside of a tamper-resistant barrier and/or passed between different virtual distribution environment participants;

Using digital signatures to determine if load module executable content is intact and was created by a trusted source (i.e., one with a correct certificate for creating load modules);

Strictly controlling initiation of load module execution by use of encryption keys, digital signatures, and/or tags;

Carefully controlling the process of creating, replacing, updating, or deleting load modules; and Maintaining shared secrets (e.g., cryptographic keys) within a tamper resistant enclosure that the owner of the electronic appliance cannot easily tamper with.

SUMMARY OF THE INVENTION

The present invention provides improved techniques for protecting secure computation and/or execution spaces from unauthorized (and potentially harmful) load modules or other executables or associated data. In accordance with one aspect provided by the present invention, one or more trusted verifying authorities validate load modules or other executables by analyzing and/or testing them. A verifying authority digitally signs and certifies the load modules or other executables that it has verified (using, for example, a public key based digital signature and/or a certificate based thereon).

Protected execution spaces such as protected processing environments can be programmed or otherwise conditioned to accept only those load modules or other executables bearing a digital signature/certificate of an accredited (or particular) verifying authority. Tamper resistant barriers may be used to protect this programming or other conditioning. The assurance levels described below are a measure or assessment of the effectiveness with which this programming or other conditioning is protected.

A web of trust may stand behind a verifying authority. For example, a verifying authority may be an independent organization that can be trusted by all electronic value chain participants not to collaborate with any particular participant to the disadvantage of other participants. A given load module or other executable may be independently certified by any number of authorized verifying authority participants. If a load module or other executable is signed, for example, by five different verifying authority participants, a user will have (potentially) a higher likelihood of finding one that they trust. General commercial users may insist on several different certifiers, and government users, large corporations, and international trading partners may each have their own unique "web of trust" requirements. This "web of trust" prevents value chain participants from conspiring to defraud other value chain participants.

In accordance with another aspect provided by this invention, each load module or other executable has specifications associated with it describing the executable, its operations, content, and functions. Such specifications could be represented by any combination of specifications, formal mathematical descriptions that can be verified in an automated or other well-defined manner, or any other forms of description that can be processed, verified, and/or tested in an automated or other well-defined manner. The load module or other executable is preferably constructed using a programming language (e.g., a language such as Java or Python) and/or design/implementation methodology (e.g., Gypsy, FDM) that can facilitate automated analysis, validation, verification, inspection, and/or testing.

A verifying authority analyzes, validates, verifies, inspects, and/or tests the load module or other executable, and compares its results with the specifications associated with the load module or other executable. A verifying authority may digitally sign or certify only those load modules or other executables having proper specifications—and may include the specifications as part of the material being signed or certified.

A verifying authority may instead, or in addition, selectively be given the responsibility for analyzing the load module and generating a specification for it. Such a specification could be reviewed by the load module's originator and/or any potential users of the load module.

A verifying authority may selectively be given the authority to generate an additional specification for the load module, for example by translating a formal mathematical specification to other kinds of specifications. This authority could be granted, for example, by a load module originator wishing to have a more accessible, but verified (certified), description of the load module for purposes of informing other potential users of the load module.

Additionally, a verifying authority may selectively be empowered to modify the specifications to make them accurate—but may refuse to sign or certify load modules or other executables that are harmful or dangerous irrespective of the accuracy of their associated specifications. The specifications may in some instances be viewable by ultimate users or other value chain participants—providing a high degree of assurance that load modules or other executables are not subverting the system and/or the legitimate interest of any participant in an electronic value chain the system supports.

In accordance with another aspect provided by the present invention, an execution environment protects itself by deciding—based on digital signatures, for example—which load modules or other executables it is willing to execute. A digital signature allows the execution environment to test both the authenticity and the integrity of the load module or other executables, as well permitting a user of such executables to determine their correctness with respect to their associated specifications or other descriptions of their behavior, if such descriptions are included in the verification process.

A hierarchy of assurance levels may be provided for different protected processing environment security levels. Load modules or other executables can be provided with digital signatures associated with particular assurance levels. Appliances assigned to particular assurance levels can protect themselves from executing load modules or other executables associated with different assurance levels. Different digital signatures and/or certificates may be used to distinguish between load modules or other executables intended for different assurance levels. This strict assurance level hierarchy provides a framework to help ensure that a more trusted environment can protect itself from load modules or other executables exposed to environments with different work factors (e.g., less trusted or tamper resistant environments). This can be used to provide a high degree of security compartmentalization that helps protect the remainder of the system should parts of the system become compromised.

For example, protected processing environments or other secure execution spaces that are more impervious to tampering (such as those providing a higher degree of physical security) may use an assurance level that isolates them from protected processing environments or other secure execution spaces that are relatively more susceptible to tampering (such as those constructed solely by software executing on a general purpose digital computer in a non-secure location).

A verifying authority may digitally sign load modules or other executables with a digital signature that indicates or implies an assurance level. A verifying authority can use digital signature techniques to distinguish between assurance levels. As one example, each different digital signature may be encrypted using a different verification key and/or fundamentally different encryption, one-way hash, and/or other techniques. A protected processing environment or other secure execution space protects itself by executing only those load modules or other executables that have been digitally signed for its corresponding assurance level.

The present invention may use a verifying authority and the digital signatures it provides to compartmentalize the different electronic appliances depending on their level of security (e.g., work factor or relative tamper resistance). In particular, a verifying authority and the digital signatures it provides isolate appliances with significantly different work factors, thus preventing the security of high work factor appliances from collapsing into the security of low work factor appliances due to the free exchange of load modules or other executables.

Encryption can be used in combination with the assurance level scheme discussed above to ensure that load modules or other executables can be executed only in specific environments or types of environments. The secure way to ensure that a load module or other executable cannot execute in a particular environment is to ensure that the environment does not have the key(s) necessary to decrypt it. Encryption can rely on multiple public keys and/or algorithms to transport basic key(s). Such encryption protects the load module or other executable from disclosure to environments (or assurance levels of environments) other than the one(s) it is intended to execute in.

In accordance with another aspect provided by this invention, a verifying authority can digitally sign a load module or other executable with several different digital signatures and/or signature schemes. A protected processing environment or other secure execution space may require a load module or other executable to present multiple digital signatures before accepting it. An attacker would have to "break" each (all) of the several digital signatures and/or signature schemes to create an unauthorized load module or other executable that would be accepted by the protected processing environment or other secure execution space. Different protected processing environments (secure execution spaces) might examine different subsets of the multiple digital signatures, so that compromising one protected processing environment (secure execution space) will not compromise all of them. As an optimization, a protected processing environment or other secure execution space might verify only one of the several digital signatures (for example, chosen at random each time an executable is used), thereby speeding up the digital signature verification while still maintaining a high degree of security.

In accordance with yet another aspect provided by the present invention(s), a tamper-resistant mechanism is provided for allowing a trusted element to validate certifications presented by applications intended to be run or otherwise used, at least in part, within an insecure environment. Such techniques can detect whether applications have been certified and/or modified (i.e., tampered with) in a way that makes them no longer trustworthy.

Briefly, examples of these techniques provide a credential having multiple elements covering corresponding parts of the application—and preferably having a combined overall effect of covering all (or a substantial portion) of the application. For example, the credential can provide verification information for different byte ranges, virtual paths, and/or other portions of the application. Sufficient verification information may be provided to substantially cover the application, or at least those portions of the application deemed to be the most likely to be tampered with.

To validate the credential, the trusted element first authenticates the credential, and then issue challenges based on different parts of the authenticated credential that the trusted element selects in an unpredictable (e.g., random) way. For example, the trusted element can repeatedly challenge the application or other agent to provide (or can itself generate) a cryptographic hash value corresponding to application portions or ranges that the trusted element randomly selects. The trusted element can compare the responses to its challenges with information the authenticated credential provides, and deny service or take other appropriate action if the comparison fails. The challenges may be repeated on an ongoing basis (e.g., during execution of the application) and/or interleaved with non-predetermined challenges not defined by the credential, to increase the tamper-resistance of the verification process.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 6 shows how a protected processing environment can securely authenticate a verifying authority's digital signature to guarantee the integrity of the corresponding load module;

FIG. 7 shows how several different digital signatures can be applied to the same load module;

FIG. 8 shows how a load module can be distributed with multiple digital signatures;

FIG. 8A shows how key management can be used to compartmentalize protected processing environments;

FIGS. 9 shows how a load module can be segmented and each segment protected with a different digital signature;

FIGS. 10A, 10B, and 10C show how different assurance level electronic appliances can be provided with different cryptographic keys for authenticating verifying authority digital signatures;

FIGS. 11A, 11B, and 11C show how a verifying authority can use different digital signatures to designate the same or different load modules as being appropriate for execution by different assurance level electronic appliances;

FIGS. 12, 13, and 13A show how assurance level digital signatures can be used to isolate electronic appliances or appliance types based on work factor and/or tamper resistance to reduce overall security risks;

FIG. 15 shows an example appliance having both secure and insecure execution spaces;

FIG. 16 shows an example process for certifying applications intended to be run in insecure execution spaces;

FIG. 16A shows an example application including multiple components;

FIG. 17 shows an example overall credential creation process;

FIG. 18 shows an example range hash block;

FIG. 19 shows example credential creation from a set of range hash blocks;

FIG. 20 shows an example threat model;

FIG. 20A shows an example of non-overlapping hash ranges;

FIG. 20B shows an example of overlapping hash ranges;

FIG. 20C shows an example use of pseudo-random validation paths within an application;

FIG. 21 shows an example simplified credential validation process; and

FIGS. 22A and 22B show an example more detailed credential validation process.

DETAILED DESCRIPTION

A detailed description of the present invention is provided below. While the invention is described in conjunction with several embodiments, it should be understood that the invention is not limited to any one embodiment, and encompasses instead, numerous alternatives, modifications and equivalents. While numerous specific details are set forth in the following description in order to provide a thorough understanding of the present invention, the present invention may be practiced without some or all of these details. Moreover, for the purpose of clarity, certain specifics relating to technical material that is known in the art related to the invention have not been described in detail in order to avoid unnecessarily obscuring the present invention.

Figure 1:
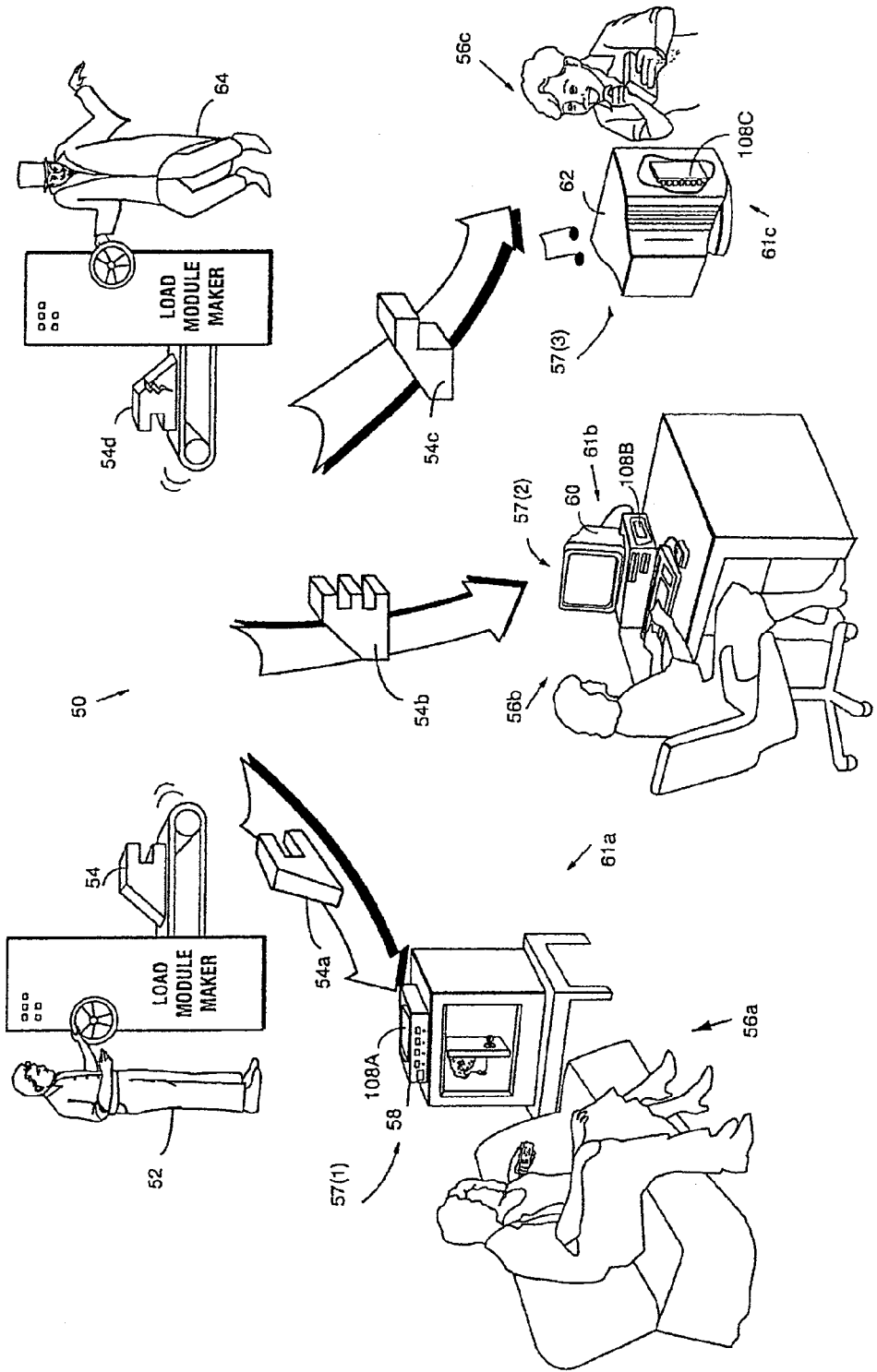
FIG. 1 illustrates how defective or bogus load modules can wreak havoc in the electronic community.

FIG. 1 shows how defective, bogus, and/or unauthorized computer information can wreak havoc within an electronic system 50. In this example, provider 52 is authorized to produce and distribute load modules 54 for use by different users or consumers 56. FIG. 1 shows load module 54 as a complicated looking machine part for purposes of illustration only; the load module preferably comprises one or more computer instructions and/or data elements used to assist, allow, prohibit, direct, control or facilitate at least one task performed at least in part by an electronic appliance such as a computer. For example, load module 54 may comprise all or part of an executable computer program and/or associated data ("executable"), and may constitute a sequence of instructions or steps that bring about a certain result within a computer or other computation element.

FIG. 1 shows a number of electronic appliances 61 such as, for example, a set top box or home media player 58, a personal computer 60, and a multi-media player 62. Each of appliances 58, 60, 62 may include a secure execution space. One particular example of a secure execution space is a protected processing environment 108, such as that described in the '900 patent. Protected processing environments 108 provide a secure execution environment in which appliances 58, 60, 62 may securely execute load modules 54 to perform useful tasks. For example:

Provider 52 might produce a load module 54a for use by the protected processing environment 108A within set top box or home media player 58. Load module 54a could, for example, enable the set top box/home media player 58 to play a movie, concert or other interesting program, charge users 56a a "pay per view" fee, and ensure that the fee is paid to the appropriate rights holder (for example, the film studio, concert promoter, or other organization that produced the program material).

Provider 52 might produce another load module 54b for delivery to personal computer 60's protected processing environment 108B. The load module 54b might enable personal computer 60 to perform a financial transaction, such as, for example, home banking, a stock trade, or an income tax payment or reporting.

Provider 52 could produce a load module 54c for delivery to multi-media player 62's protected processing environment 108c. This load module 54c might allow user 56c to view a particular multi-media presentation while preventing the user from making a copy of the presentation—or it could control a portion of a transaction (e.g. a meter that records usage, and is incorporated into a larger transaction involving other load modules associated with interacting with a multi-media piece). (Load modules associated with the financial portion of a transaction, for example, may often be self-contained and independent).

FIG. 1 also shows an unauthorized and/or disreputable load module provider 64. Unauthorized provider 64 knows how to make load modules that look a lot like the load modules produced by authorized load module provider 52, but are defective or even destructive. Unless precautions are taken, the unauthorized load module 54d made by unauthorized producer 64 will be able to run on protected processing environments 108 within appliances 58, 60 and 62, and may cause serious harm to users 56 and/or to the integrity of system 50. For example:

unauthorized provider 64 could produce a load module 54d that is quite similar to authorized load module 54a intended to be used by set top box or home media player 58. The unauthorized load module 54d might allow protected processing environment 108A within set top box/home media player 58 to present the very same program material, but divert some or all of the user's payment to unauthorized producer 64, thereby defrauding the rights holders in the program material that the users watch.

Unauthorized provider 64 might produce an unauthorized version of load module 54b that could, if run by personal computer 60's protected processing environment 108B, disclose the user 56b's bank and credit card account numbers to unauthorized provider 64 and/or divert electronic or other funds to the unauthorized provider.

Unauthorized provider 64 could produce an unauthorized version of load module 54c that could damage the protected processing environment 108C within multi media player 62—erasing data it needs for its operation and making it unusable. Alternatively, an unauthorized version of load module 54c could defeat the copy protection provided by multi-media player 62's protected processing environment, causing the makers of multi media programs to lose substantial revenues through unauthorized copying—or could defeat or alter the part of the transaction provided by the load module (e.g., billing, metering, maintaining an audit trail, etc.).

Figure 2:
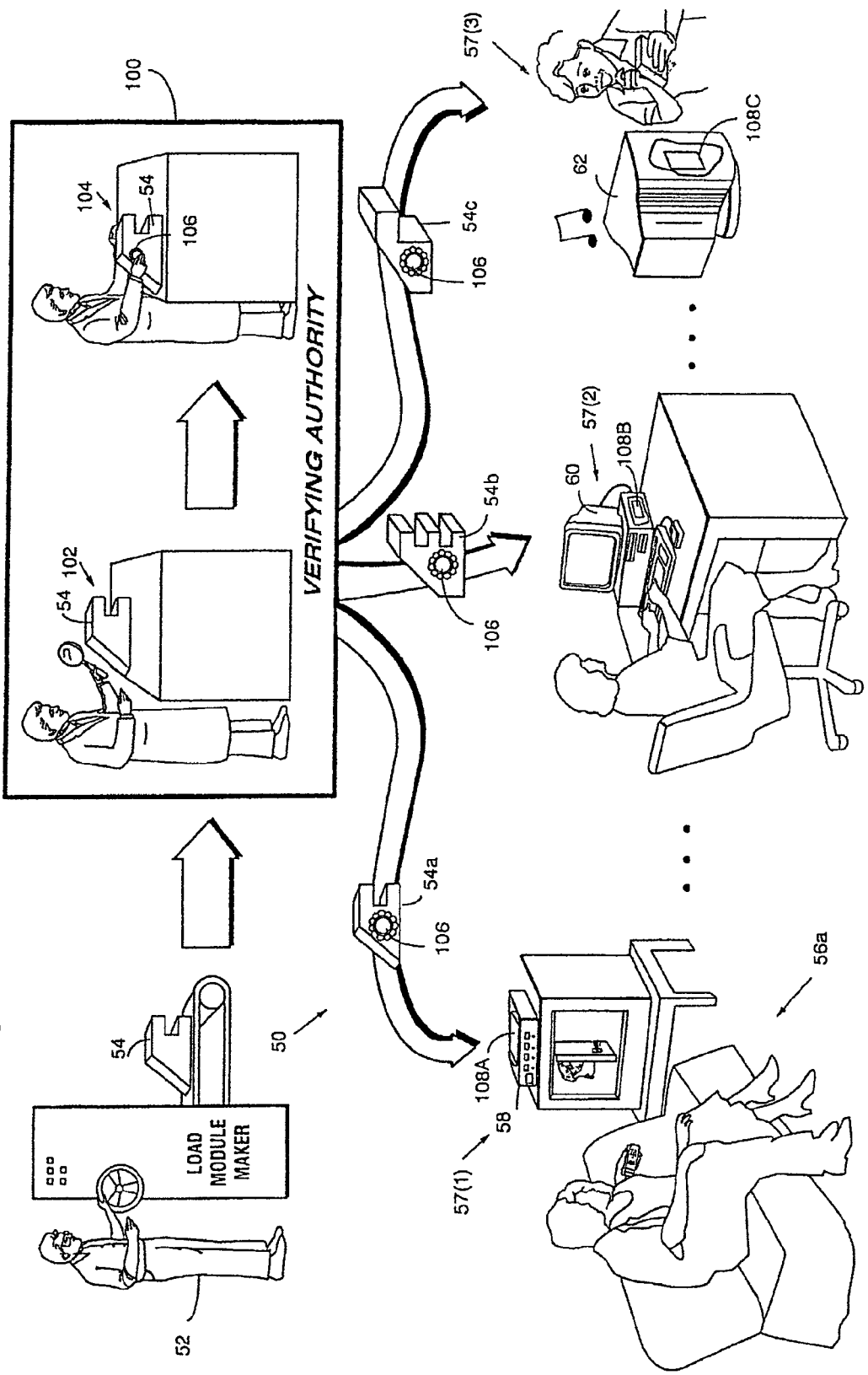
FIG. 2 shows an example verification authority that protects the electronic community from unauthorized load modules.

FIG. 2 shows how a verifying authority 100 can prevent the problems shown in FIG. 1. In this example, authorized provider 52 submits load modules 54 to verifying authority 100. Verifying authority 100 carefully analyzes the load modules 54 (see 102), testing them to make sure they do what they are supposed to do and do not compromise or harm system 50. If a load module 54 passes the tests verifying authority 100 subjects it to, a verifying authority may affix a digital "seal of approval" (see 104) to the load module.

Figure 3:
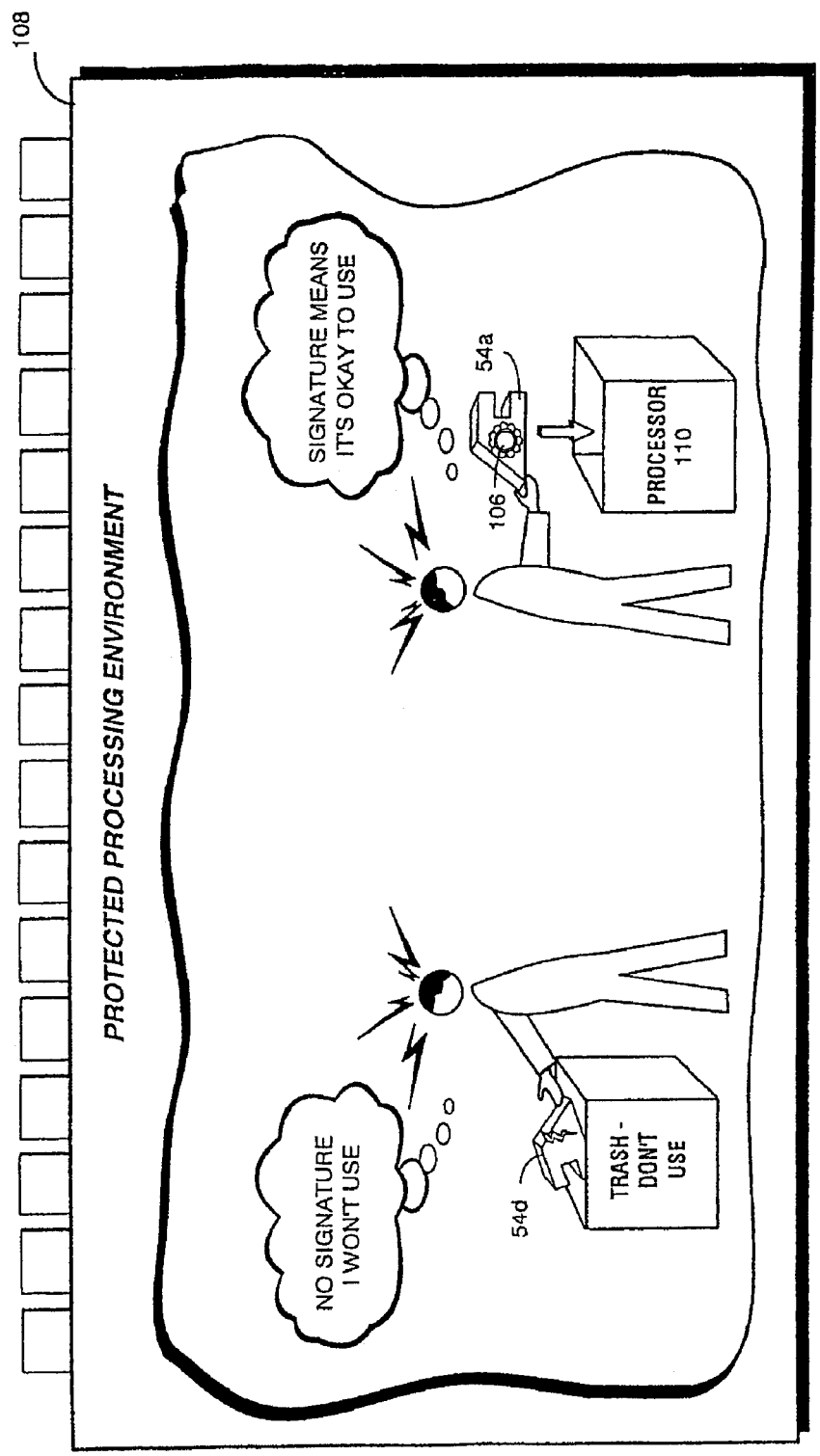
FIG. 3 shows how a protected processing environment can distinguish between load modules that have been approved by a verifying authority and those that have not been approved.

Protected processing environments 108 can use this digital seal of approval 106 (which may comprise one or more digital signatures) to distinguish between authorized and unauthorized load modules 54. FIG. 3 illustrates how an electronic protected processing environment 108 can use and rely on a verifying authority's digital seal of approval 106. In this example, the protected processing environment 108 can distinguish between authorized and unauthorized load modules 54 by examining the load module to see whether it bears the seal of verifying authority 100. Protected processing environment 108 will execute the load module 54a with its processor 110 only if the load module bears a verifying authority's seal 106. Protected processing environment 108 discards and does not use any load module 54 that does not bear this seal 106. In this way, protected processing environment 108 securely protects itself against unauthorized load modules 54 such as, for example, the defective load module 54d made by disreputable load module provider 64.

Figure 4:
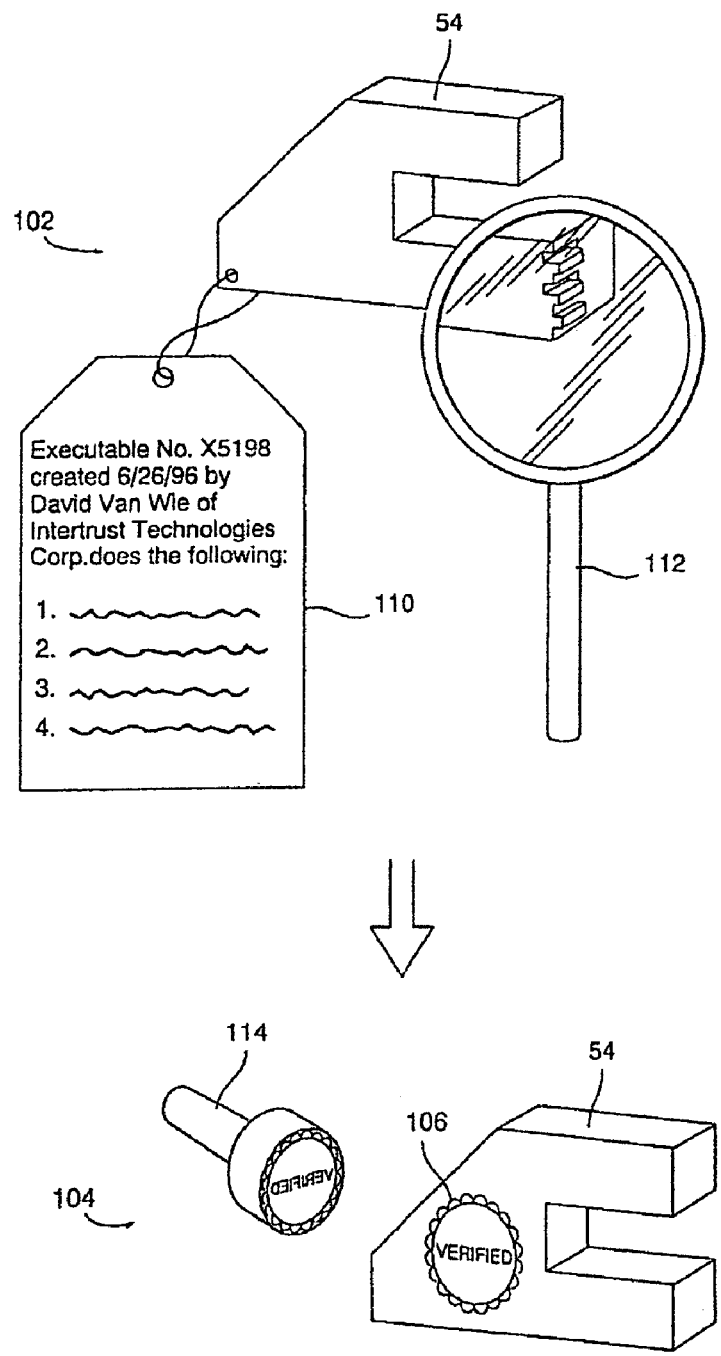
FIG. 4 shows an example process a verifying authority may perform to authenticate load modules.

FIG. 4 shows the analysis and digital signing steps 102, 104 performed by verifying authority 100 in this example. Provider 52 may provide, with each load module 54, associated specifications 110 identifying the load module and describing the functions the load module performs. In this example, these specifications 110 are illustrated as a manufacturing tag, but preferably comprise a data file associated with and/or attached to the load module 54.

Verifying authority 100 uses an analyzing tool(s) 112 to analyze and test load module 54 and determine whether it performs as specified by its associated specifications 110—that is, whether the specifications are both accurate and complete. FIG. 4 illustrates an analysis tool 112 as a magnifying glass; verifying authority 100 may not rely on visual inspection only, but instead preferably uses one or more computer-based software testing techniques and/or tools to verify that the load module performs as expected, matches specifications 110, is not a "virus," and includes no significant detectable "bugs" or other harmful functionality. (See, for example, Pressman, "Software Engineering: A Practitioner's Approach," 3d ed., chapters 18 and 19, pages 595-661 (McGraw-Hill 1992), and the various books and papers referenced therein). Although it has been said that "testing can show only the presence of bugs, not their absence," such testing (in addition to ensuring that the load module 54 satisfies its specifications 110) can provide added degrees of assurance that the load module isn't harmful and will work as it is supposed to.

Verifying authority 100 is preferably a trusted, independent third party such as an impartial, well respected independent testing laboratory. Therefore, all participants in an electronic transaction involving load module 54 can trust a verifying authority 100 as performing its testing and analysis functions competently and completely objectively and impartially. As described above, there may be several different verifying authorities 100 that together provide a "web of trust." Several different verifying authorities may each verify and digitally sign the same load module, thus increasing the likelihood that a particular value chain participant will trust one of them, and decreasing the likelihood of collusion or fraud. Electronic value chain participants may rely upon different verifying authorities 100 to certify different types of load modules. For example, one verifying authority 100 trusted by and known to financial participants might verify load modules relating to financial aspects of a transaction (e.g., billing), whereas another verifying authority 100' trusted by and known to participants involved in using the "information exhaust" provided by an electronic transaction might be used to verify load modules relating to usage metering aspects of the same transaction.

Figure 5:
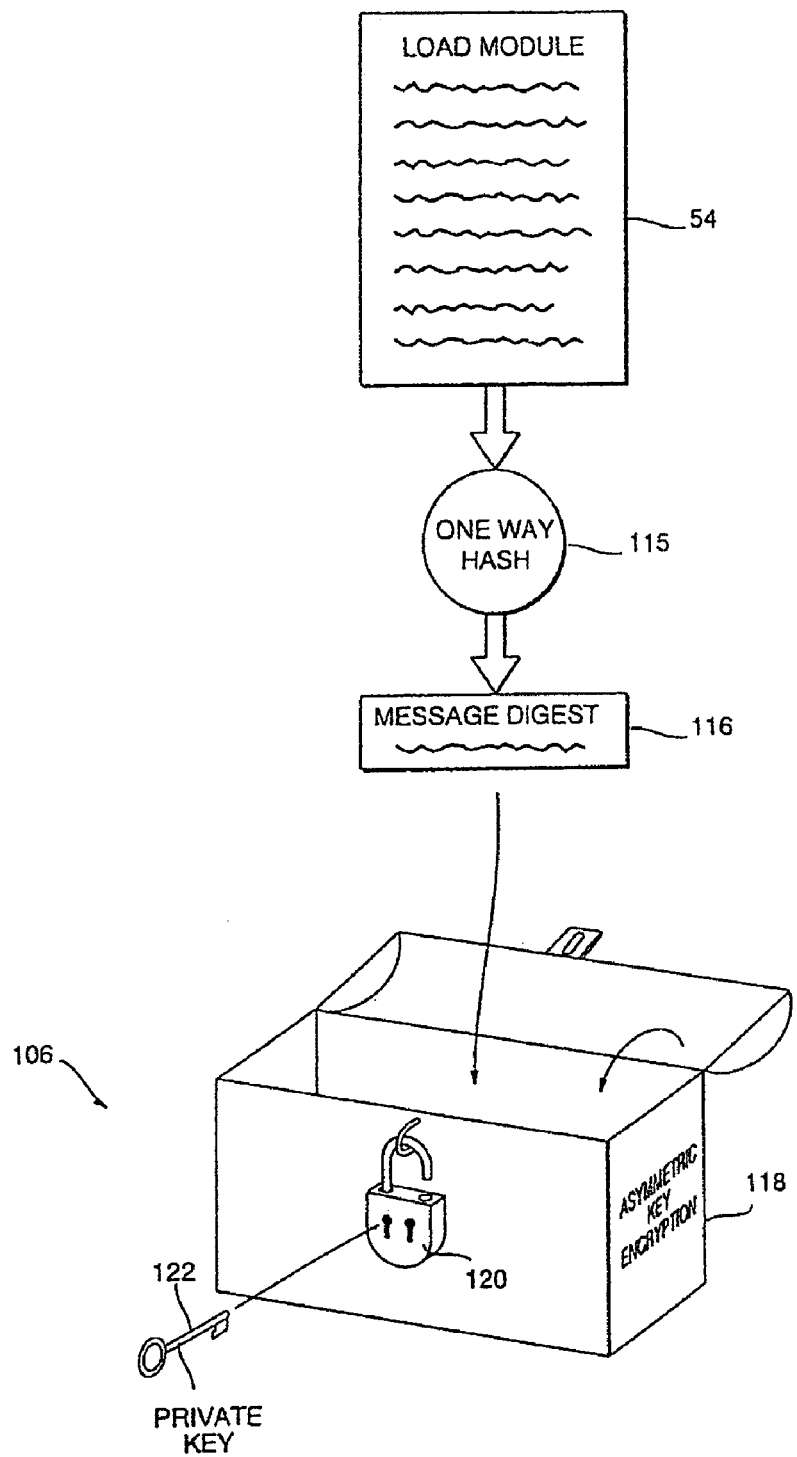
FIG. 5 shows how a verifying authority can create a certifying digital signature.

Once verifying authority 100 is satisfied with load module 54, it affixes its digital seal of approval 106 to the load module. FIG. 4 illustrates the digital sealing process as being performed by a stamp 114, but in a preferred embodiment the digital sealing process is actually performed by creating a digital signature using a well-known process, such as one or more of the techniques described in Schneier, "Applied Cryptography," 2d ed., chapter 20, pages 483-502 (John Wiley & Sons 1996), which is hereby incorporated by reference. This digital signature, certificate, or seal creation process is illustrated in FIG. 5. For convenience, information on suitable digital signature techniques has also been set forth in Appendix A hereto.

In the FIG. 5 process, load module 54 (along with specifications 110 if desired) is processed to yield a message digest 116 using one or more one-way hash functions selected to provide an appropriate resistance to algorithmic attack. For example, use could be made of the well-known transformation processes discussed in the Schneier text at chapter 18, pages 429-455, which is hereby incorporated by reference. A one-way hash function 115 provides a "fingerprint" (message digest 116) that is effectively unique to load module 54. The one-way hash function transforms the contents of load module 54 into message digest 116 based on a mathematical function. This one-way hash mathematical function has the characteristic that it is easy to calculate message digest 116 from load module 54, but it is hard (computationally infeasible) to calculate load module 54 starting from message digest 116 and it is also hard (computationally infeasible) to find another load module 54' that will transform to the same message digest 116. There are many potential candidate functions (e.g., MD5, SHA, MAC), families of functions (e.g., MD5, or SHA with different internal constants), and keyed functions (e.g., message authentication codes based on block ciphers such as DES) that may be employed as one-way hash functions in this scheme. Different functions may have different cryptographic strengths and weaknesses so that techniques which may be developed to defeat one of them are not necessarily applicable to others.

Message digest 116 may then be encrypted using asymmetric key cryptography. FIG. 5 illustrates this encryption operation using the metaphor of a strong box 118. The message digest 1 116 is placed into strong box 118, and the strongbox is locked with a lock 120 having two key slots opened by different ("asymmetrical") keys. A first key 122 (sometimes called the "private" key) is used to lock the lock. A second (different) key 124 (sometimes called the "public" key) must be used to open the lock once the lock has been locked with the first key. The encryption algorithm and key length are selected so that it is computationally infeasible to calculate first key 122 given access to second key 124, the public key encryption algorithm, the clear text message digest 116, and the encrypted digital signature 106. There are many potential candidate algorithms for this type of asymmetric key cryptography (e.g., RSA, DSA, E1 Gamal, Elliptic Curve Encryption). Different algorithms may have different cryptographic strengths and weaknesses so that techniques which may be developed to defeat one of them are not necessarily applicable to others.

In this case the first key is owned by verifying authority 100 and is kept highly secure (for example, using standard physical and procedural measures typically employed to keep an important private key secret while preventing it from being lost). Once message digest 116 is locked into strong box 118 using the first key 122, the strong box can be opened only by using the corresponding second key 124. Note that other items (e.g., further identification information, a time/date stamp, etc.) can also be placed within strong box 106.

FIG. 6 shows how a protected processing environment 108 authenticates the digital signature 106 created by the FIG. 5 process. Second key 124 and the one-way hash algorithm are first securely provided to the protected processing environment. For example, a secure key exchange protocol can be used as described in connection with FIG. 64 of the '900 patent. Public key cryptography allows second key 124 to be made public without compromising first key 122. However, in this example, protected processing environment 108 preferably keeps the second key 124 (and, if desired, also the one-way hash algorithm and/or its associated key) secret to further increase security.

Maintaining public verification key 124 as a secret within tamper resistant protected processing environment 108 greatly complicates the job of generating bogus digital signatures. If the attacker does not possess second key 124, the difficulty of an algorithmic attack or cryptanalytic attack on the verification digital signature algorithm is significantly increased, and the attacker might be reduced to exhaustive search (brute force) type attacks which would be even less practical because the search trials would require attempting to present a bogus load module 54 to protected processing environment 108, which, after a few such attempts, is likely to l refuse all further attempts. Keeping second key 124 secret also necessitates a multi-disciplinary attack: an attacker must both (A) extract the secret from protected processing environment 108, and (B) attack the algorithm. It may be substantially less likely that a single attacker may have expertise in each of these two specialized disciplines.

In addition, maintaining the public key within a tamper-resistant environment forecloses the significant threat that the owner of protected processing environment 108 may himself attack the environment. For example, if the owner could replace the appropriate public key 124 with his own substitute public key, the owner could force the protected processing environment 108 to execute load modules 54 of his own design, thereby compromising the interests of others in enforcing their own controls within the owner's protected processing environment. For example, the owner could turn off the control that required him to pay for watching, or the control that prohibited him from copying content. Since protected processing environment 108 can support a "virtual business presence" by parties other than the owner, it is important for the protected processing environment to be protected against attacks from the owner.

The load module 54 and its associated digital signature 106 are then delivered to the protected processing environment 108. (These items can be provided together at the same time, independently, or at different times.) Protected processing environment 108 applies the same one way hash transformation on load module 54 that a verifying authority 100 applied. Since protected processing environment 108 starts with the same load module 54 and uses the same one-way hash function 115, it should generate the same message digest 116'.

Protected processing environment 108 then decrypts digital signature 106 using the second key 124—i.e., it opens strongbox 118 to retrieve the message digest 116 that a verifying authority 100 placed therein. Protected processing environment 108 compares the version of message digest 116 it obtains from the digital signature 106 with the version of message digest 116' it calculates itself from load module 54 using the one way hash transformation 115. The message digests 116, 116' should be identical. If they do not match, digital signature 106 is not authentic or load module 54 has been changed, and protected processing environment 108 rejects load module 54.

FIG. 7 shows that multiple digital signatures 106(1), 106(2), . . . 106(N) can be created for the same load module 54. For example:
   one digital signature 106(1) can be created by encrypting message digest 116(1) with a private key 122(1);
   another (different) digital signature 106(2) can be created by encrypting the message digest 116(2) with a different private key 122(2), possibly employing a different signature algorithm; and
   a still different digital signature 106(N) can be generated by encrypting the message digest 116(N) using a still different private key 122(N), possibly employing yet another signature algorithm.

The public key 124(1) corresponding to private key 122(1) acts only to decrypt (authenticate) digital signature 106(1). Similarly, digital signature 106(2) can only be decrypted (authenticated) using public key 124(2) corresponding to the private key 122(2). Public key 124(1) will not "unlock" digital signature 106(2) and public key 124(2) will not unlock digital signature 106(1).

Different digital signatures 106(1), 106(N) can also be made by using different one way hash functions 115 and/or different encryption algorithms. As shown in FIG. 8, a load module 54 may have multiple different types of digital signatures 106 associated with it. Requiring a load module 54 to present, to a protected processing environment 108, multiple digital signatures 106 generated using fundamentally different techniques decreases the risk that an attacker can A successfully manufacture a bogus load module 54.

For example, as shown in FIG. 8, the same load module 54 might be digitally signed using three different private keys 122, cryptographic algorithms, and/or hash algorithms. If a given load module 54 has multiple distinct digital signatures 106 each computed using a fundamentally different technique, the risk of compromise is substantially lowered. A single algorithmic advance is unlikely to result in simultaneous success against both (or multiple) cryptographic algorithms. The two digital signature algorithms in widespread use today (RSA and DSA) are based on distinct mathematical problems (factoring in the case of RSA, discrete logs for DSA). The most currently popular one-way hash functions (MD4/MD5 and SHA) have similar internal structures, possibly increasing the likelihood that a successful attack against one would lead to a success against another. However, hash functions can be derived from any number of different block ciphers (e.g., SEAL, IDEA, triple-DES) with different internal structures; one of these might be a good candidate to complement MD5 or SHA.

Multiple signatures as shown in FIG. 8 impose a cost of additional storage for the signatures 106 in each protected load module 54, additional code in the protected processing environment 108 to implement additional algorithms, and additional time to verify the digital signatures (as well as to generate them at verification time). As an optimization to the use of multiple keys or algorithms, an appliance 61 might verify only a subset of several signatures associated with a load module 54 (chosen at random) each time the load module is used. This would speed up signature verification while maintaining a high probability of detection. For example, suppose there are one hundred private verification keys, and each load module 54 carries one hundred digital signatures. Suppose each protected processing environment 108, on the other hand, knows only a few (e.g., ten) of the corresponding public verification keys randomly selected from the set. A successful attack on that particular protected processing environment 108 would permit it to be compromised and would also compromise any other protected processing environment possessing and using precisely that same set of ten keys. However, it would not compromise most other protected processing environments, since they would employ a different subset of the keys used by verifying authority 100.

FIG. 8A shows a simplified example of different processing environments 108(1), . . . 108(N) possessing different subsets of public keys used for digital signature authentication, thereby compartmentalizing the protected processing environments based on key management and availability. The FIG. 8A illustration shows each protected processing environment 108 having only one public key 124 that corresponds to one of the digital signatures 106 used to sign load module 54. As explained above, any number of digital signatures 106 may be used to sign the load module 54, and different protected processing environments 108 may possess any subset of the corresponding public keys.

FIG. 9 shows that a load module 54 may comprise multiple segments 55(1), 55(2), 55(3) signed using different digital signatures 106. For example:

- a first load module segment 55(1) might be signed using a digital signature 106(1);
- a second load module segment 55(2) might be digitally signed using a second digital signature 106(2); and
- a third load module segment 55(3) might be signed using a third digital signature 106(3).

These three signatures 106(1), 106(2), 106(3) could all be affixed by the same verifying authority 100, or they could be affixed by three different verifying authorities (providing a "web of trust"). (In another model, a load module is verified in its entirety by multiple parties—if a user trusts any of them, she can trust the load module.) A protected processing environment 108 would need to have all three corresponding public keys 124(1), 124(2), 124(3) to authenticate the entire load module 54—or the different load module segments could be used by different protected processing environments possessing the corresponding different keys 124(1), 124(2), 124(3). Different signatures 106(1), 106(2), 106(3) could be calculated using different signature and/or one-way hash algorithms to increase the difficulty of defeating them by cryptanalytic attack.

Assurance Levels

Verifying authority 100 can use different digital signing techniques to provide different "assurance levels" for different kinds of electronic appliances 61 having different "work factors" or levels of tamper resistance. FIGS. 10A-10C show an example assurance level hierarchy providing three different assurance levels for different electronic appliance types:

- Assurance level I might be used for an electronic appliance (s) 61 whose protected processing environment 108 is based on software techniques that may be somewhat resistant to tampering. An example of an assurance level I electronic appliance 61A might be a general purpose personal computer that executes software to create protected processing environment 108.
- An assurance level II electronic appliance 61B may provide a protected processing environment 108 based on a hybrid of software security techniques and hardware-based security techniques. An example, of an assurance level II electronic appliance 61B might be a general purpose personal computer equipped with a hardware integrated circuit secure processing unit ("SPU") that performs some secure processing outside of the SPU. (See FIG. 10 of the '900 patent and associated text). Such a hybrid arrangement might be relatively more resistant to tampering than a software-only implementation.
- The assurance level III appliance 61C shown is a general purpose personal computer equipped with a hardware-based secure processing unit providing and completely containing protected processing environment 108. (See, for example, FIGS. 6 and 9 of the '900 patent). A silicon-based special purpose integrated circuit security chip is relatively more tamper-resistant than implementations relying on software techniques for some or all of their tamper-resistance.

In this example, verifying authority 100 digitally signs load modules 54 using different digital signature techniques (for example, different private keys 122) based on assurance level. The digital signatures 106 applied by verifying authority 100 thus securely encode the same (or different) load module 54 for use by appropriate corresponding assurance level electronic appliances 61.

The assurance level in this example may be assigned to a particular protected processing environment 108 at initialization (e.g., at the factory in the case of hardware-based secure processing units). Assigning the assurance level at initialization time facilitates the use of key management (e.g., secure key exchange protocols) to enforce isolation based on assurance level. For example, since establishment of assurance level is done at initialization time, rather than in the field in this example, the key exchange mechanism can be used to provide new keys (assuming an assurance level has been established correctly).

Within a protected processing environment 108, as shown in FIGS. 10A-10C, different assurance levels may be assigned to each separate instance of a channel (see, e.g., the '900 patent, FIG. 15) contained therein. In this way, each secure processing environment and host event processing environment (see, e.g., the '900 patent, FIG. 10 and associated description) contained within an instance of a protected processing environment 108 may contain multiple instances of a channel, each with independent and different assurance levels. The nature of this feature of the invention permits the separation of different channels within a protected processing environment 108 from each other, each channel possibly having identical, shared, or independent sets of load modules for each specific channel limited solely to the resources and services authorized for use by that specific channel. In this way, the security of the entire protected processing environment is enhanced and the effect of security breaches within each channel is compartmentalized solely to that channel.

As shown in FIGS. 11A-11C, different digital signatures and/or signature algorithms corresponding to different assurance levels may be used to allow a particular execution environment to protect itself from particular load modules 54 that are accessible to other classes or assurance levels of electronic appliances. As shown in FIGS. 11A-11C:

- A protected processing environment(s) of assurance level I protects itself (themselves) by executing only load modules 54 sealed with an assurance level I digital signature 106(I). Protected processing environment(s) 108 having an associated assurance level I is (are) securely issued a public key 124(I) that can "unlock" the level I digital signature.
- Similarly, a protected processing environment(s) of assurance level II protects itself (themselves) by executing only the same (or different) load modules 54 sealed with a level II digital signature 106(II). Such a protected processing environment 108 having an associated corresponding assurance level II possesses a public key 124(II) used to unlock the level II digital signature.
- A protected processing environment(s) 108 of assurance level III protects itself (themselves) by executing only load modules 54 having a digital signature 106(III) for assurance level III. Such an assurance level III protected processing environment 108 possesses a corresponding assurance level III public key 124(III). Key management encryption (not signature) keys can allow this protection to work securely.

In this example, electronic appliances 61 of different assurance levels can communicate with one another and pass load modules 54 between one another—an important feature providing a scaleable virtual distribution environment involving all sorts of different appliances (e.g., personal computers, laptop computers, handheld computers, television sets, media players, set top boxes, Internet browser appliances, smart cards, mainframe computers, etc.). The present invention uses verifying authority 100 and the digital signatures it provides to compartmentalize the different electronic appliances depending on their level of security (e.g., work factor or relative tamper resistance). In particular, verifying authority 100 and the digital signatures it provides isolate appliances with significantly different work factors, thus preventing the security of high work factor appliances from collapsing into the security of low work factor appliances due to the free exchange of load modules 54.

In one example, verifying authority 100 may digitally sign identical copies of a load module 54 for use by different classes or assurance levels of electronic appliances 61. If the sharing of a load module 54 between different electronic appliances is regarded as an open communications channel between the protected processing environments 108 of the two appliances, it becomes apparent that there is a high degree of risk in permitting such sharing to occur. In particular, the extra security assurances and precautions of the more trusted environment are collapsed into those of the less trusted environment because an attacker who compromises a load module within a less trusted environment is then able to launch the same load module to attack the more trusted environment. Hence, although compartmentalization based on encryption and key management can be used to restrict certain kinds of load modules 54 to execute only on certain types of electronic appliances 61, a significant application in this context is to compartmentalize the different types of electronic appliances and thereby allow an electronic appliance to protect itself against load modules 54 of different assurance levels.

FIG. 12 emphasizes this isolation using the illustrative metaphor of desert islands. It shows how assurance levels can be used to isolate and compartmentalize any number of different types of electronic appliances 61. In this example:

Personal computer 60(1) providing a software-only protected processing environment 108 may be at assurance level I;

Media player 400(1) providing a software-only based protected processing environment may be at assurance level II;

Server 402(1) providing a software-only based protected processing environment may be at assurance level III;

Support service 404(1) providing a software-only based protected processing environment may be at assurance level IV;

Personal computer 60(2) providing a hybrid software and hardware protected processing environment 108 may be at assurance level V;

Media player 400(2) providing a hybrid software and hardware protected processing environment may be at assurance level VI;

Server 402(2) providing a software and hardware hybrid protected processing environment may be at assurance level VII;

Support service 404(2) providing a software and hardware hybrid protected processing environment may be at assurance level VIII; and Personal computer 60(3) providing a hardware-only protected processing environment 108 may be at assurance level IX;

Media player 400(3) providing a hardware-only protected processing environment may be at assurance level X;

Server 402(3) providing a hardware-only based protected processing environment may be at assurance level XI;

Support service 404(3) providing a hardware-only based protected processing environment may be at assurance level XII.

In accordance with this feature of the invention, verifying authority 100 supports all of these various categories of digital signatures, and system 50 uses key management to distribute the appropriate verification keys to different assurance level devices. For example, verifying authority 100 may digitally sign a particular load module 54 such that only hardware-only based server(s) 402(3) at assurance level XI may authenticate it. This compartmentalization prevents any load module executable on hardware-only servers 402(3) from executing on any other assurance level appliance (for example, support service 404(1) with a software-only based protected processing environment).

To simplify key management and distribution, execution environments having significantly similar work factors can be classified in the same assurance level. FIG. 13 shows one example of a hierarchical assurance level arrangement. In this example, less secure, software-only protected processing environment 108 devices are categorized as assurance level I, somewhat more secure, software-and-hardware-hybrid protected processing environment appliances are categorized as assurance level II, and more trusted, hardware-only protected processing environment devices are categorized as assurance level III.

Figure 13A:
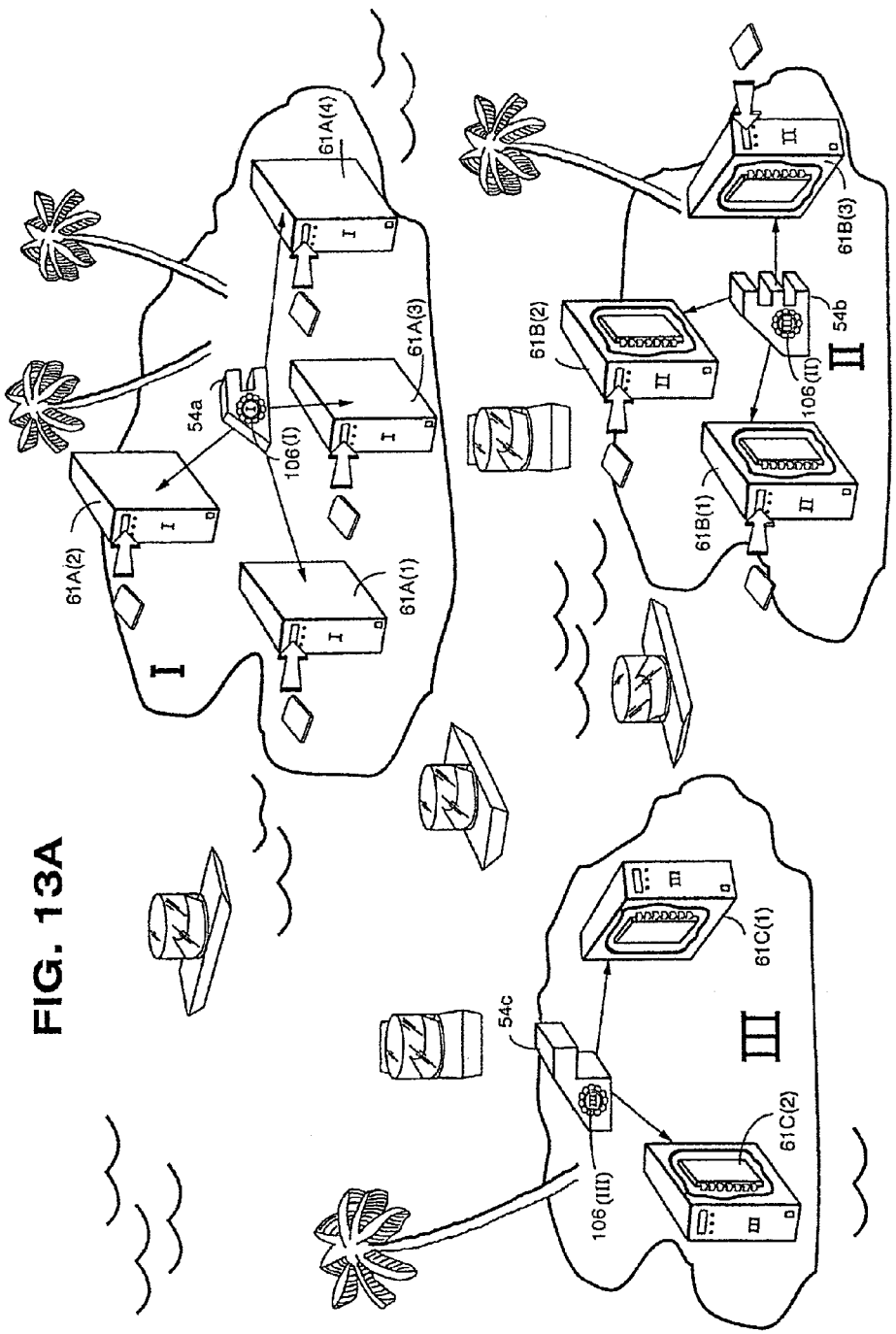

To show this type of isolation, FIG. 13A shows three example corresponding "desert islands." Desert island I is "inhabited" by personal computers 61A providing a software-only protected processing environment. The software-only protected processing environment based personal computers 61 A that inhabit desert island I are all of the same assurance level—and thus will each authenticate (and may thus each use) an assurance level I load module 54a. Desert island II is inhabited by assurance level II hybrid software and hardware protected processing environment personal computers 61B. These assurance level II personal computers will each authenticate (and may thus each execute) an assurance level II load module 54b. Similarly, desert island III is inhabited by assurance level III personal computers 61C providing hardware-only protected processing environments. These assurance level III devices 61C may each authenticate and execute an assurance level III load module 54c.

The desert islands are created by the use of different digital signatures on each of load modules 54a, 54b, 54c. In this example, all of the appliances 61 may freely communicate with one another (as indicated by the barges—which represent electronic or other communications between the various devices). However, because particular assurance level load modules 54 will be authenticated only by appliances 61 having corresponding assurance levels, the load modules cannot leave their associated desert island, providing isolation between the different assurance level execution environments. More specifically, a particular assurance level appliance 61 thus protects itself from using a load, module 54 of a different assurance level. Digital signatures (and/or signature algorithms) 106 in this sense create the isolated desert islands shown, since they allow execution environments to protect themselves from "off island" load modules 54 of different assurance levels.

A load module or other executable may be certified for multiple assurance levels. Different digital signatures may be used to certify the same load module or other executable for different respective assurance levels. The load module or other executable could also be encrypted differently (e.g. using different keys to encrypt the load module) based on assurance level. If a load module is encrypted differently for different assurance levels, and the keys and/or algorithms that are used to decrypt such load modules are only distributed to environments of the same assurance level, an additional measure of security is provided. The risk associated with disclosing the load module or other executable contents (e.g., by decrypting encrypted code before execution) in a lower assurance environment does not compromise the security of higher assurance level systems directly, but it may help the attacker learn how the load module or other executable works and how to encrypt them—which can be important in making bogus load modules or other executables (although not in certifying them—since certification requires keys that would only become available to an attacker who has compromised the keys of a corresponding appropriate assurance level environment). Commercially, it may be important for administrative ease and consistency to take this risk. In other cases, it will not be (e.g. provider sensitivities, government uses, custom functions, etc.).

Figure 14:
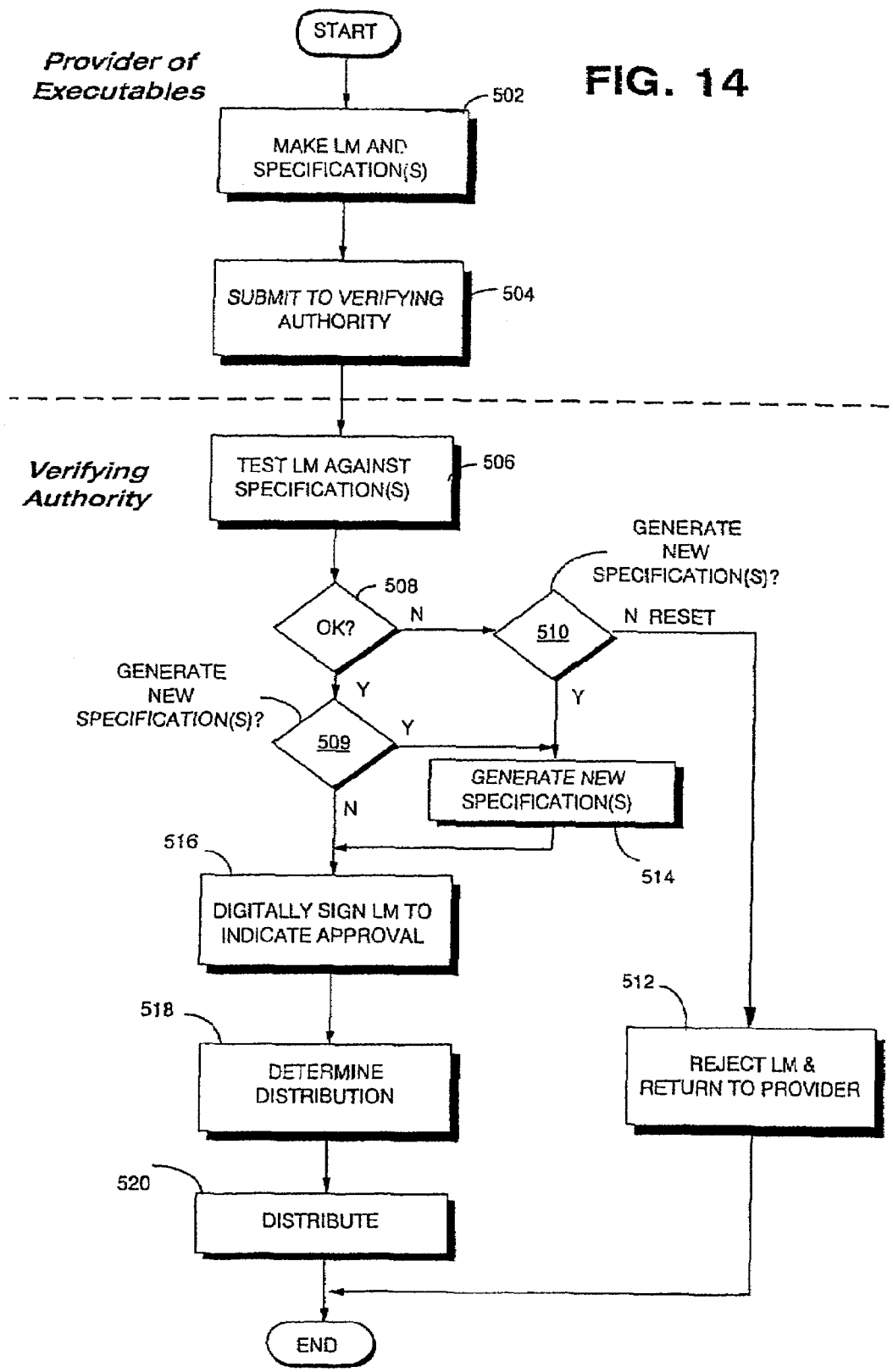
FIG. 14 shows example overall steps that may be performed within an electronic system (such as, for example, a virtual distribution environment) to test, certify, distribute and use executables.

FIG. 14 shows an example sequence of steps that may be performed in an overall process provided by these inventions. To begin the overall process, a load module provider 52 may manufacture a load module and associated specifications (FIG. 14, block 502). Provider 52 may then submit the load module and associated specifications to verifying authority 100 for verification (FIG. 14, block 504). Verifying authority 100 may analyze, test, and/or otherwise validate the load module against the specifications (FIG. 14, block 506), and determine whether the load module satisfies the specifications.

If the load module is found to satisfy its specifications, a verifying authority 100 determines whether it is authorized to generate one or more new specifications for the load module (FIG. 14, block 509). If it is authorized and this function has been requested ("Y" exit from decision block 509), a verifying authority generates specifications and associates them with the load module (FIG. 14, block 514).

If the load module fails the test ("N" exit from decision block 508), verifying authority 100 determines whether it is authorized and able to create new specifications corresponding to the actual load module performance, and whether it is desirable to create the conforming specifications (FIG. 14, decision block 510). If verifying authority 100 decides not to make new specifications ("N" exit from decision block 510), verifying authority returns the load module to provider 52 (block 512) and the process ends. On the other hand, if verifying authority 100 determines that it is desirable to make new specifications and it is able and authorized to do so, a verifying authority 100 may make new specifications that conform to the load module ("Y" exit from decision block 510; block 514).

A verifying authority 100 may then digitally sign the load module 54 to indicate approval (FIG. 14, block 516). This step 516 may involve applying multiple digital signatures and/or a selection of the appropriate digital signatures to use in order to restrict the load module to particular assurance levels of electronic appliances as discussed above. Verifying authority 100 may then determine the distribution of the load module (FIG. 14, block 518). This "determine distribution" step may involve, for example, determining who the load module should be distributed to (e.g., provider 52, support services 404, a load module repository operated by a verifying authority, etc.) and/or what should be distributed (e.g., the load module plus corresponding digital signatures, digital signatures only, digital signatures and associated description, etc.). Verifying authority 100 may then distribute the appropriate information to a value chain using the appropriate distribution techniques (FIG. 14, block 520).

Certifying Applications Intended For Insecure Environments

Truly secure certification validation is performed in a secure environment such as within a protected processing environment 108 or other secure, tamper-resistant space. The secure environment's tamper-resistance prevents an attacker from defeating the validation process. However, not all applications are intended to be run within a secure environment.

For example, some arrangements use a trusted element to perform certain secure functions, but perform other tasks within an insecure environment. FIG. 15 shows an example electronic appliance 61 including a trusted element such as a secure execution space 108 and an insecure execution space 550. Appliance 61 might, for example, be a personal computer providing trusted element 108 in the form of a hardware or software tamper-resistant protected processing environment; and insecure execution space 550 in the form of the personal computer processor's typical execution space. It may be desirable to permit an application (e.g., a program) 600 executing within insecure execution space 550 to request services from trusted element 108. In this scenario, it would be desirable to allow a validation authority 100 to certify the application (e.g., to ensure that the application follows rules for good application behavior)—and allow the trusted element 108 to validate the application's certification before providing any services to it. For example, trusted element 108 can refuse to provide a requested service if application 600 has not been certified or if application 600 has been tampered with.

Since insecure execution space 550 does not provide the tamper-resistance necessary to support truly secure validation of application 600, it would be desirable to provide a tamper-resistant mechanism for allowing trusted element 108 to validate certifications presented by applications intended to be run or otherwise used, at least in part, within an insecure environment.

In accordance with a further presently preferred example embodiment, tamper-resistant techniques are provided for certifying and validating applications 600 intended to be executed or otherwise used at least in part within insecure environments 550. Such techniques can detect whether applications 600 have been certified and/or whether they have been modified (i.e., tampered with) in a way that makes them no longer trustworthy.

Briefly, examples of these techniques provide a credential having multiple elements covering corresponding parts of the application—and preferably having a combined overall effect of covering all (or a substantial portion) of the application 600. For example, the credential can provide verification information for different byte ranges, virtual paths, and/or other portions of application 600. Sufficient verification information may be provided to substantially cover the application or at least the portions of the application most likely to be tampered with.

To validate the credential, the trusted element 108 may authenticate the credential, and then issue challenges based on different parts of the authenticated credential that the trusted element selects in an unpredictable (e.g., random) way. For example, the trusted element 108 can repeatedly challenge application 600 or other agent to provide (or it can itself generate) a cryptographic hash value corresponding to application portions the trusted element 108 randomly selects. The trusted element 108 can compare the responses to its challenges with information the authenticated credential provides, and deny service to application 600 or take other appropriate action if the comparison fails. The challenges may be repeated on an ongoing basis (e.g., during execution of application 600) and/or interleaved with non-predetermined challenges not defined by the credential, to increase the tamper-resistance of the verification process.

FIG. 16 shows an example process for certifying an application 600. In this example, verifying authority 100 takes application program 600 and performs a credential generating process 610 to yield a credential 612. As part of a software manufacturing process 614, the application program 600 and credential 612 are packaged on a distribution medium 616 and made available for use.

As shown in FIG. 16A, application 600 may include different components. For example application 600 may include one or more read-only application components such as executable component 601(1), library component 601(2), and/or other read-only component 601(N). Application program 600 may also include one or more modifiable (read-write) components 603(1), . . . , 603(N). The modifiable components 603 are typically not certified because of their modifiability; however, it may be desirable to certify any or all of the read-only components 601 irrespective of whether they are executable code, data, or a combination or hybrid. The credential 612 created by credential generating process 610 can provide verification information corresponding to each of these read-only components 601(1), . . . 601(N).

FIG. 17 shows an example credential generating process 610. In this example, application 600 is certified by taking each read-only application component 601 and repeatedly applying to it, the overall process 610 shown in FIG. 17.

In this FIG. 17 example, the verifying authority 100 performs a selection process to select a portion of application 600—for example, a random byte range, virtual path, or other subset of the information contained in the application component being certified (FIG. 17, block 700). The verifying authority 100 applies a cryptographic hash function to the selected portion to yield a portion hash value associated with that subset and that component (FIG. 17, block 702). Verifying authority 100 then generates a portion hash block describing that portion (FIG. 17, block 704).

FIG. 18 shows an example hash block 740 generated by FIG. 17, block 704. In this particular example, portion hash block 740 has the following elements:
  a component ID 741 that designates the application (and/or component) from which the hash value is calculated;
  a lower bound field 742 and upper bound field 743 together specifying the byte range used in the hash calculation; and
  a hash value 744 that is the result of the hash calculation process of FIG. 17, block 702.

Referring once again to FIG. 17, blocks 700, 702, 704 are repeated enough times to generate the required quantity of portion hash values. Preferably, enough hash values are calculated to ensure that every byte in each application component is represented by more than one hash value. That is, every byte is contained in more than one hashed portion and thus in more than one associated hash block 740. As mentioned above, in one example the portions to be hashed are randomly selected to provide a high degree of unpredictability.

To help explain how many different portions of application 600 to select and hash, FIG. 20 shows an example "threat model" that the disclosed credential creation process 610 is designed to counter. In this threat model, an attacker tampers with application 600 by static modification (e.g., patching) by, for example, substituting the attacker's critical component 802 for a corresponding critical component 804 within the application. To counter this threat, the credential creation process 610 selects a sufficient quantity of different application portion hashes to provide "coverage" for critical component 804. Preferably, enough hash values are calculated to ensure that critical component 804 is represented by more than one hash value. Since it may be desirable to protect substantial portions (or the entire) application 600, not all hash ranges will necessarily cover any given critical component 804.

The hash ranges selected by FIG. 17, block 700 may be disjoint (see FIG. 20A), or they may overlap arbitrarily (see FIG. 20B). It is even possible that a selection process of FIG. 17, block 700 will randomly select precisely the same portion of application 600 twice.

Although a straightforward way to specify portions of application 600 is in terms of byte ranges defined between upper and lower bounds (see FIG. 18), other ways to specify portions are also possible. For example, FIG. 20C shows application portion selection based on pseudo-random validation paths within application 600. In this example, the FIG. 17, block 700 "select application component portion" step selects application 600 portions to be hashed based on execution or other data traversal access paths defined within application 600. FIG. 20C shows two such paths 850(1) and 850(2). Each of paths 850(1), 850(2) in this example passes through critical component 804—and the resulting hash values thus each protect the critical component. Any number of such paths 850(N) can be selected.

Once the required quantity of hash values has been calculated (FIG. 17, block 708), the resulting hash blocks 740(1), . . . 740(N) are organized in one or more groups 745 (see FIG. 19). Each group 745 may contain one or more range block 740. A digital signature process 751 is then performed on the information in each group, yielding a digital signature 746 (FIG. 17, block 712; see FIG. 19). In one example, these steps may be performed, for example, by cryptographically hashing the hash block set 745, and then digitally signing the resulting hash with a global credential signing key 761 (FIG. 17, blocks 710, 712).

The digital signature process 751 may be performed with a public key (asymmetrical) algorithm using global credential signing key 761. As is typical for digital signatures, the digital signature process 751 may involve first calculating a cryptographic hash function over the set 745, and then creating a digital signature representing the hash. A secret key authentication (Message Authentication Code) process may be used in place of signature process 751—although this may reduce resistance to attacks during the certification generation process.

The global credential signing key 761 may be chosen from a set of global signing keys, such that the corresponding credential validation key is guaranteed to be available to the validator where application 600 will be used. The identity of signing key 761 is preferably incorporated within credential 612. Different signing keys 761 can be used to distinguish among applications 600 suitable for different types or classes of electronic appliances 61 distinguished by different validators. Multiple signatures 746 can be calculated using different credential signing keys 761 to permit an application 600 to be validated with different credential validation keys.

In this particular example, an encryption process 752 is then applied to the combination of set 745 and its digital signature 746 to yield a credential part 747 (FIG. 17, block 714; see FIG. 19). Encryption process 752 may be performed using an asymmetric (public key) algorithm employing a global credential encryption key 762. The encryption process 752 may involve first generating a random key for a symmetric (secret key) algorithm, using the symmetric algorithm for encryption of the credential data, and using the symmetric algorithm for encrypting the random key. A secret key encryption process may be substituted for encryption process 752 (such substitution may reduce the resistance against attacks on the credential creation process).

Encryption key 762 may be chosen from a set of global credential encryption keys, such that the corresponding decryption key is guaranteed to be present at the trusted element 108 where the application 600 will be used. Different encryption keys 762 can be used to distinguish among applications suitable for different environments, as described above. The signature process 751 and encryption process 752 may be applied in any order and to any arbitrary selection or subsets 745 of hash blocks 740 such that the result protects the contents of hash blocks from disclosure and/or modification.

In this example, all resulting encrypted credential parts 747 are combined to produce credential 612 (FIG. 17, block 716). Credential 612 may also include (in signed encrypted form) additional information about application 600 including, for example, the number of components in the application, the size and location of each component, information about the identity of the application and/or its manufacturer, information allowing verifying authority 100 to specify a set or subset of secure operations that the application is permitted to access, and/or other information.

FIG. 21 shows an overall example credential validation process 900 performed by appliance 61. In this example, appliance 61 includes a trusted element 108 (e.g., a protected processing environment) providing a validator function 920. In this example, validation process, 900 takes information from distribution medium 616 (which may have been copied to other media) and presents it to appliance 61 for validation by validator 920 within trusted element 108. Thus, in this example, it is trusted element 108, not application 600, that is trusted—and the trusted element is responsible for validating the application before the trusted element will provide any services to the application.

In this particular example, when appliance 61 begins to use or execute application 600, trusted element 108 performs a validation process in which credential 612 is presented to validator 920 along with data calculated by a "select" process based on application 600. The validator 920 determines whether credential 612 is a valid representation of application 600.

FIGS. 22A and 22B show a more detailed example validation process 900. In this example, application 600 presents its encrypted credential 612 and requests authorization (FIG. 22A, block 950). Validation process 900 decrypts the credential 612 using the global credential decryption key 763 corresponding to the global credential encryption key 762 used at creation time (FIG. 22A, block 952; see FIG. 22B). Validation process 900 then validates the digital signature 746 for any credential part 747 that it uses, using global signature validation key 764 that corresponds to the credential signing key 761 used when the credential 612 was created (FIG. 22A, block 954). Steps 952, 954 may be performed on individual table entries, or sets 745, or they may be performed on the entire credential 612.

Assuming the digital signature 746 is valid, validation process 900 validates the application 600 by repeatedly selecting or choosing portions of application 600, issuing challenges to compute cryptographic hashes corresponding to the selected portions, and checking responses to ensure they correctly correspond to information within credential 612. In more detail, validation process 900 in this example initially chooses whether or not to select, for its next iteration, a portion of application 600 predetermined by credential 612 (e.g., a portion for which there is a corresponding hash block 745 within the credential) (FIG. 22A, decision block 956). If validation process 900 chooses to use a predetermined portion (i.e., a "yes" exit from decision block 956), it randomly selects one of the hash blocks 745 from credential 612 and determines the component ID 741 and portion definition (e.g., address lower bound 742 and upper bound 743) from the selected range hash block (FIG. 22A, block 958). The validation process 900 then issues a challenge to compute the cryptographic hash corresponding to the selected address range in the selected component (FIG. 22A, block 960).

In one example, the validation process 900 challenges the application 600 itself to compute the cryptographic hash. In this example, application 600 thus includes an executable routine that accepts a component ID/portion definition as an input parameter, and returns the corresponding cryptographic hash of that component ID/portion. Application 600 calculates a cryptographic hash of the selected address range in response to the challenge, and returns the response for receipt by validating process 900 (FIG. 22A, block 962).

The cryptographic hash can be computed in alternate ways that do not require application 600 itself to respond to the challenge. For example, when running under an operating system that supports shared memory (e.g., Microsoft Windows NT or Windows 95), validation process 900 may map one or more regions of its own address space to correspond to the application's read only components 601(1), . . . , 601(N), and make the required checksum (hash) calculation itself. Alternatively, validation process 900 can employ and request an agent, surrogate, or service process to make the necessary mapping(s) to share the address space of application 600 and enable and perform the checksum calculation. Some operating systems may require the cooperation of application 600 to allow regions of its memory to be shared with validation process 900 and/or its agent—but failure of an attempt to establish such sharing can be considered clear evidence that application 600 is not certified.

Using shared memory to allow the validator 920 or its trusted agent to calculate cryptographic hashes directly significantly increases the difficulty of a "copy" or "substitution" attack. Thus, using shared memory mapping in this manner increases tamper-resistance because it becomes less feasible for the application 600 to provide known answers to the challenge. Further, using shared memory to facilitate process 900 allows the challenge-response process to be performed without any interference with or effect on application 600. Because application 600 is not even aware of the challenges and corresponding response in the shared-memory scenario, it is not able to intercept them in order to supply misleading answers. This makes it possible to perform validation 900 at arbitrary instants during the operation of application 600, as well as making it infeasible for application 600 to detect the challenge actions and substitute its own misleading responses.

Validating process 900 then determines whether the computed hash value equals the hash value 744 from the hash block 745 supplied by credential 612 (FIG. 22A, decision block 964). If the returned value does not match, validating process 900 refuses to accept application 600, returning a "false" result (FIG. 22A, block 966).

One purpose of blocks 968-974 shown in FIG. 22A is to conceal the portions of application 600 that are actually predefined by credential 612. Thus, if validating process 900 chooses to use a portion that is not predefined (i.e., a "no" exit from decision block 956), the process randomly chooses a component ID and address lower bound and upper bound (or other suitable portion definition) and then issues a challenge to compute the corresponding cryptographic hash (FIG. 22A, blocks 968, 970). As before, application 600 or another agent returns the calculated corresponding hash value (FIG. 22A, block 972). In this case, however, validating process 900 has nothing to compare the response to, and in this example, it simply ignores it (FIG. 22A, block 974). If the "no" exit from decision block 956 is chosen often, most challenges will not be meaningful, and it will be difficult for an adversary to collect a table of all the necessary responses in order to falsify an application's response.

In this example, blocks 956-976 are repeated a random number of times sufficient to provide a reasonable probability that the application 600 is providing correct answers and has not been modified (as tested for by FIG. 22A, decision block 976). Preferably, blocks 956-976 should be repeated until all bytes in the application 600 have been checked at least once against a real hash value supplied by a credential 612 hash block 745. Complete coverage is desirable because tampering may require modifying only a few bytes in application 600.

The validation process 900 shown in FIG. 22A may be performed repeatedly at initialization and/or during operation of application 600. Validation challenges occurring during normal operation may be more difficult to tamper with than those that occur at the well-defined point of initialization.

Attacks on Validation Process

The forms of tampering countered by validation process 900 include:
 (1) static substitution of an entire program for a certified application;
 (2) static modification (e.g., patching) of a certified application; and
 (3) use of a modified credential corresponding to a different or modified application.

Any of these forms of tampering would require that the application 600 be able to construct, interpret, or simulate credentials 612. Construction and interpretation is countered by the secrecy of keys. Simulation is countered by the use of many different ranges, and by false ranges; if a malicious program wanted to provide the "correct" response in order to appear as if it were a different "certified" program, it would have to record all the possible challenges and responses. Because the challenges for any one validation are a small, randomly selected subset of all those in the credential, collecting them all would be time-consuming and expensive.

A "correct" response can be simulated by calculating it from a complete copy of a certified program, while running a malicious program. That is probably the simplest technical attack that will defeat this arrangement. Other simulation attacks are significantly more difficult, requiring that challenges and responses be recorded and replayed. As described above, use of shared memory increases the difficulty of a "copy" or "substitution" attack.

Although the foregoing invention has been described in some detail for purposes of clarity, it will be apparent that certain changes and modifications may be practiced within the scope of the appended claims. It should be noted that there are many alternative ways of implementing both the processes and apparatuses of the present invention. Accordingly, the present embodiments are to be considered as illustrative and not restrictive, and the invention is not to be limited to the details given herein, but may be modified within the scope and equivalents of the appended claims.

Appendix A

There exist many well-known processes for creating digital signatures. One example is the Digital Signature Algorithm (DSA). DSA uses a public-key signature scheme that performs a pair of transformations to generate and verify a digital value called a "signature." DSA uses the parameters, p, q, g, x, and y, such that:

p=a prime number L bits long, wherein L ranges from 512 to 1024 and is a multiple of 64;

q=a 160-bit prime factor of $p-1$;

$g=h^{(P-1)/q}$ mod p, where h is any number less than $p-1$ such that $h^{(P-1)/q}$ mod p is greater than 1;

x=a number less than q; and $y=g^x$ mod p.

The algorithm also makes use of a one-way hash function, H(m), such as, for example, the Secure Hash Algorithm. The first three parameters, p, q, and g, are public and may be shared across a network of users. The private key is x; the public key is y. To sign a message, m, using DSA, a signer generates a random number, k, less than q. The signer also generates:

$r=(g^k \bmod p) \bmod q$; and $s=(k^{-1}(H(m)+xr)) \bmod q$

The parameters r and s comprise the signer's signature, which may be sent to a recipient or distributed across a network. A recipient verifies the signature by computing:

$w=s^{-1} \bmod q$;

$u_1=(H(m)*w) \bmod q$;

$u_2=(rw) \bmod q$; and $v=(g^{u1}*y^{u2}) \bmod p) \bmod q$.

If v=r, the signature is verified.

There exist multiple variations of DSA. In one such variant, for example, the signer does not compute k−1. Instead, using the same parameters as in DSA, the signer generates two random numbers, k and d, both less than q. The signature comprises:

$r=(g^k \bmod p) \bmod q$;

$s=(H(m)+xr)-d \bmod q$; and t=kd mod q.

A recipient verifies the signature by computing:

$w=t/s \bmod q$;

$u_1=(H(m)*w) \bmod q$; and $u_2=(rw) \bmod q$.

If $r=((g^{u_1} \cdot y^{u_2}) \bmod p) \bmod q$, then the signature is verified.

In other variants, the signer may generate a random number, k, less than q. The signature then comprises:

$r=(g^k \bmod p) \bmod q$; and $s=k*(H(m)+xr)^{-1} \bmod q$

A recipient verifies the signature by computing $u_1$ and $u_2$, such that:

$$u_1=(H(m)*s) \bmod q$$

$$u_2=(sr) \bmod q$$

If $r=((g^{u_1} \cdot y^{u_2}) \bmod p) \bmod q$, then the signature is verified.

Yet another variant of DSA uses a prime number generation scheme that embeds q and the parameters used to generate the primes within p. Using this method, the values of C and S used to generate p and q are embedded within p and do not need to be stored, thereby minimizing the amount of memory used. This variant may be described as follows:
(1) Choose, S, arbitrary sequence of at least 160 bits; g is the length of S in bits;
(2) Compute U=SHA(S)+SHA ((S+1) mod $2^g$), where SHA is the Secure Hash Algorithm;
(3) Let q=U with the most significant bit and the least significant bit of U set to 1;
(4) Check whether q is prime;
(5) Let p be the concatenation of q, S, C, and SHA(S), C is set to 32 zero bits;
(6) p=p−(p mod q)+1;
(7) p=p+q;
(8) If the C in p is 0×7fffffff, go to step (1);
(9) Check whether p is prime; and
(10) If p is composite, go to step (7).

Still another variant of DSA is the Russian digital signature standard, officially known as GOST R 34-10-94. The algorithm is very similar to DSA, and uses the following parameters:

p=a prime number, either between 509 and 512 bits long, or between 1020 and 1024 bits long;

$q$=a 254- to 256-bit prime factor of $p-1$;

$a$=any number less than $p-1$ such that $aq \bmod p=1$;

x=a number less than q; and $y=a^x \bmod p$.

This algorithm also uses a one-way hash function, H(x), such as, for example, GOST R 34.11-94, a function based on the GOST symmetric algorithm. The first three parameters, p, q, and a, are public and may be distributed across a network of users. The private key is x, the public key is y.

To sign a message, m, using GOST DSA, a signer generates a random number, k, less than q, and generates $r=(a^k \bmod p) \bmod q$ and $s=(xr+k(H(m))) \bmod q$. If H(m) mod q=0, then set it equal to 1. If r=0, then choose another k and start again. The signature is comprised of two numbers: r mod $2^{256}$ and s mod $2^{256}$. A sender transmits these two numbers to a recipient, who verifies the signature by computing:

$$v=H(m)^{q-2} \bmod q;$$

$$z^1=(sv) \bmod q;$$

$$z^2=((q-r)*v) \bmod q; \text{ and}$$

$$u=((a^{z1} * y^{z2}) \bmod p) \bmod q.$$

If u=r, then the signature is verified.

Many signature schemes are very similar. In fact, there are thousands of general digital signature schemes based on the Discrete Logarithm Problem, like DSA. Additional information on the digital signature standard can be found in National Institute of Standards and Technology (NIST) FIPS Pub. 186, "Digital Signature Standard," U.S. Dept. of Commerce, May 1994.

What is claimed is:

1. In an electronic appliance including a secure execution space and an insecure execution space, a method for permitting an application executing within the insecure execution space to request one or more services from a trusted element executing in the secure execution space, the method comprising:
   (a) issuing a challenge from the trusted element to the application executing within the insecure execution space, the challenge being based at least in part on randomly selected parts of an authenticated credential, the challenge requesting the application to provide one or more cryptographic hashes of one or more portions of the application, the one or more portions of the application including at least some executable software code;
   (b) sending, from the application to the trusted element, said one or more cryptographic hashes of one or more portions of the application;
   (c) comparing, at the trusted element, information provided by the authenticated credential with said one or more cryptographic hashes of one or more portions of the application; and
   (d) denying the application access to said one or more services if the comparison fails.

2. A method as in claim 1, in which steps (a)-(d) are performed multiple times during execution of the application.

3. A method as in claim 1, in which the authenticated credential is digitally signed.

4. A method as in claim 1, in which the authenticated credential is at least in part encrypted.

5. A method as in claim 1, in which the one or more portions of the application include code.

6. A method as in claim 1, in which at least one of the portions of the application overlaps another of the portions of the application.

7. A method as in claim 1, in which at least one of the one or more portions of the application corresponds to a predetermined byte range or virtual path in the application.

8. A computer readable storage medium storing a computer program, the computer program including instructions that, when executed by a processor of an electronic appliance, are operable to cause the electronic appliance to take actions comprising:
   (a) issuing a challenge from a trusted element executing in a secure execution space to an application executing in an insecure execution space, the challenge being based at least in part on randomly selected parts of an authenticated credential, the challenge requesting the application to provide one or more cryptographic hashes of one or more portions of the application, the one or more portions of the application including at least some executable software code;
   (b) receiving, from the application, said one or more cryptographic hashes of one or more portions of the application;
   (c) comparing information provided by the authenticated credential with said one or more cryptographic hashes of one or more portions of the application; and
   (d) denying the application access to one or more services provided by an application executing in the secure execution space if the comparison fails.

9. A computer readable storage medium as in claim 8, in which the computer program is operable to cause the electronic appliance to perform actions (a)-(d) multiple times during execution of the application.

10. A computer readable storage medium as in claim 8, in which the authenticated credential is digitally signed.

11. A computer readable storage medium as in claim 8, in which the authenticated credential is at least in part encrypted.

12. A computer readable storage medium as in claim 8, in which the one or more portions of the application include code.

13. A computer readable storage medium as in claim 8, in which at least one of the portions of the application overlaps another of the portions of the application.

14. A computer readable storage medium as in claim 8, in which at least one of the one or more portions of the application corresponds to a predetermined byte range or virtual path in the application.

15. An electronic appliance comprising:
   an insecure execution space; and
   a protected processing environment comprising a processor having a secure execution space including a trusted element, the trusted element configured to:
   (a) issue a challenge to an application executing in the insecure execution space, the challenge being based at least in part on randomly selected parts of an authenticated credential, the challenge requesting the application to provide one or more cryptographic hashes of one or more portions of the application, the one or more portions of the application including at least some executable software code;
   (b) receive, from the application, said one or more cryptographic hashes of one or more portions of the application;
   (c) compare information provided by the authenticated credential with said one or more cryptographic hashes of one or more portions of the application; and
   (d) deny the application access to one or more services provided by an application executing in the secure execution space if the comparison fails.

16. An electronic appliance as in claim 15, in which the secure execution space comprises a protected processing environment.

17. An electronic appliance as in claim 15, in which the authenticated credential is digitally signed and at least in part encrypted.

18. An electronic appliance as in claim 15, in which the one or more portions of the application include code.

19. An electronic appliance as in claim 18, in which at least one of the portions of the application overlaps another of the portions of the application.

20. An electronic appliance as in claim 19, in which at least one of the one or more portions of the application corresponds to a predetermined byte range or virtual path in the application.

21. In an electronic appliance including a secure execution space and an insecure execution space, a method for using a trusted element executing in the secure execution space comprising:
   validating at least one digital signature corresponding to a credential;
   selecting, based at least in part on the credential, at least one predetermined portion of an application executing in the insecure execution space, the predetermined portion of the application including at least some executable software code, and issuing a challenge requesting a response from the application, the response providing a computation of at least one cryptographic hash of the selected predetermined portion of the application, wherein the predetermined portion of the application has been selected to provide sufficient coverage of a particular component of the application; and
   checking the response against the credential.

* * * * *